(12) United States Patent
Kimura et al.

(10) Patent No.: US 7,178,157 B1
(45) Date of Patent: Feb. 13, 2007

(54) INFORMATION TRANSMISSION SYSTEM, INFORMATION OUTPUT APPARATUS, INFORMATION INPUT APPARATUS, AND CONNECTION RELATIONSHIP IDENTIFICATION METHOD

(75) Inventors: Yuji Kimura, Kanagawa (JP); Kazue Sadanaka, Tokyo (JP); Satoshi Kobayashi, Tokyo (JP); Hiroshi Utsunomiya, Chiba (JP); Futoshi Kaibuki, Tokyo (JP); Kazuhiro Suzuki, Kanagawa (JP); Kenji Matsuoka, Kanagawa (JP); Masahiko Sato, Tokyo (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1339 days.

(21) Appl. No.: 09/708,256

(22) Filed: Nov. 7, 2000

(30) Foreign Application Priority Data

Nov. 17, 1999 (JP) ............................... P11-327491

(51) Int. Cl.
*H04N 5/445* (2006.01)
*G06F 3/00* (2006.01)
*G06F 13/00* (2006.01)

(52) U.S. Cl. .......................... 725/38; 725/48; 725/59

(58) Field of Classification Search ................. 725/38, 725/48, 59; 348/460, 461, 473
See application file for complete search history.

(56) References Cited

U.S. PATENT DOCUMENTS 6,219,839 B1 * 4/2001 Sampsell ..................... 725/40
6,588,012 B2 * 7/2003 Tanaka et al. ................ 725/29

FOREIGN PATENT DOCUMENTS

| EP | 0 843 468 | 5/1998 |
| WO | WO 99/35856 | 7/1999 |
| WO | WO 00/13408 | 3/2000 |

\* cited by examiner

*Primary Examiner*—John Miller
*Assistant Examiner*—Hunter B. Lonsberry
(74) *Attorney, Agent, or Firm*—Oblon, Spivak, McClelland, Maier & Neustadt, P.C.

(57) ABSTRACT

A control section of an IRD sends an identification start request to a digital bus via a digital input/output terminal. The control section generates an identification display message by controlling an identification display message generation section, makes a superimposition section superimpose the identification display message on an analog video signal, and outputs a resulting signal via an analog output terminal. An information input apparatus allows a user to identify an input terminal connected to the output terminal of the IRD among a plurality of input terminals of the self apparatus by reproducing the identification display message and presenting it to the user.

62 Claims, 14 Drawing Sheets

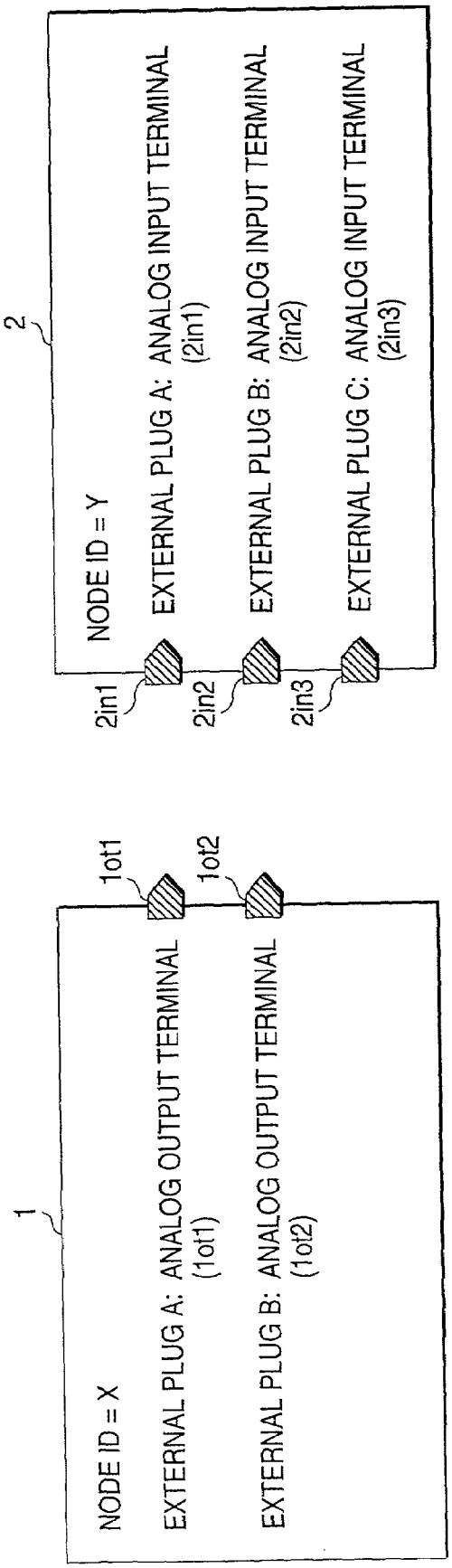

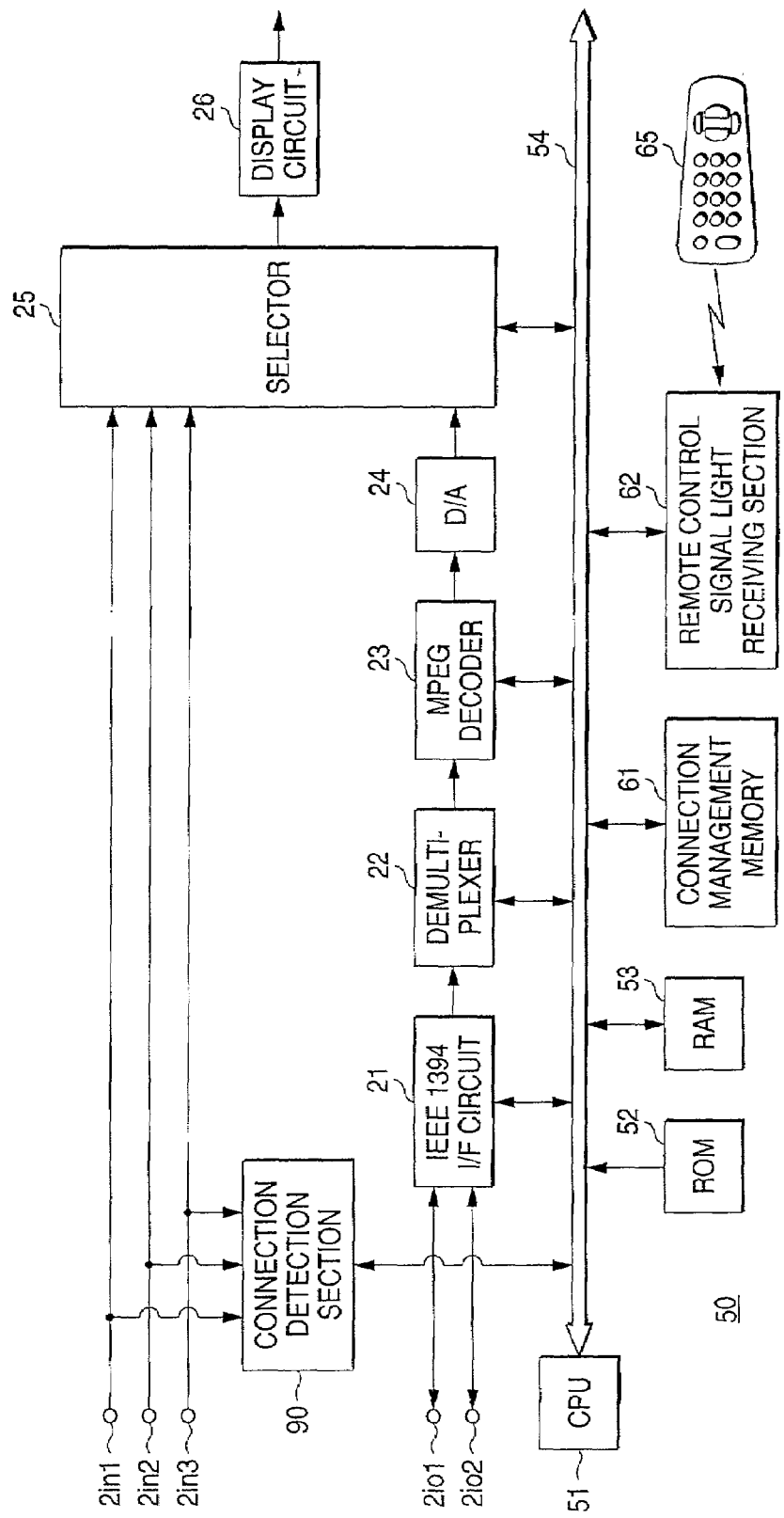

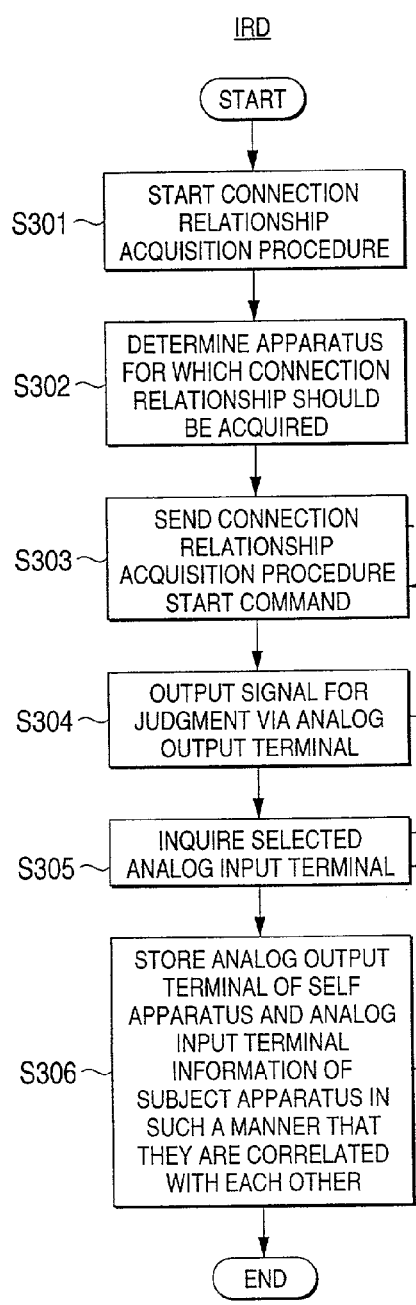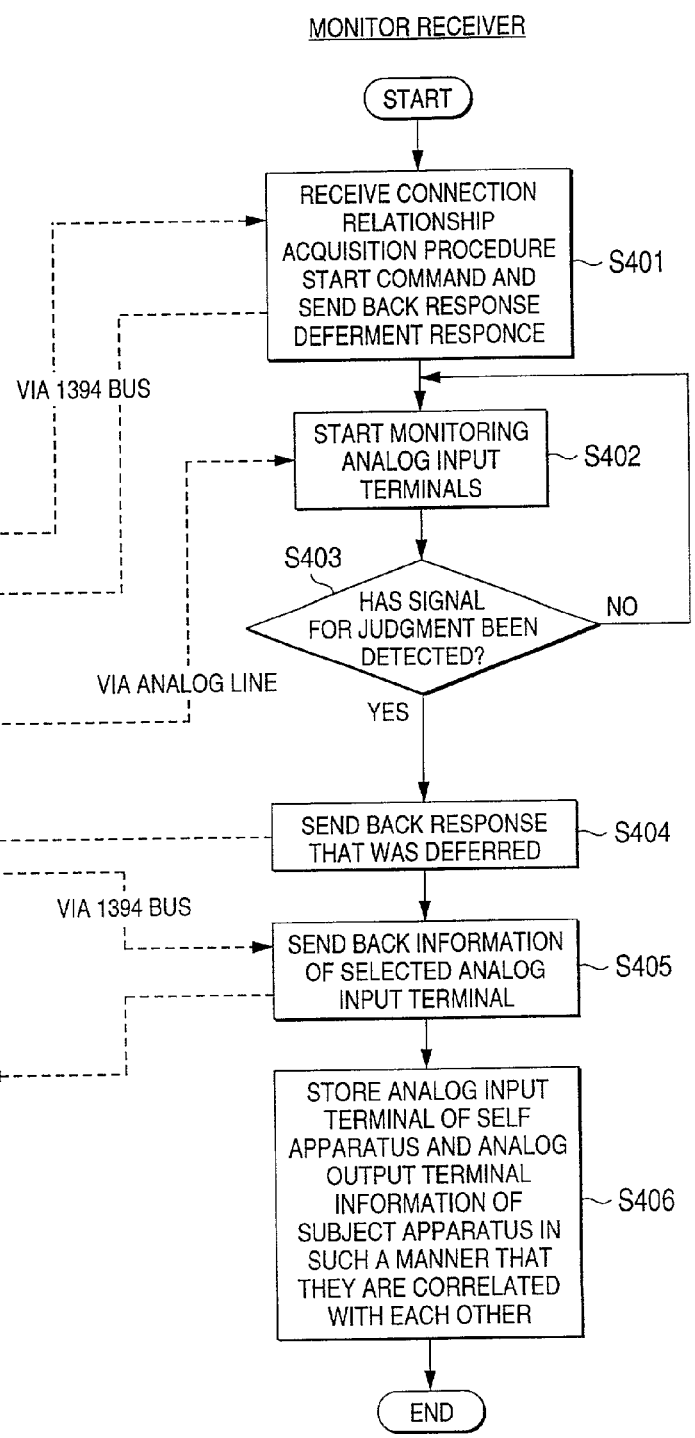
FIG. 11A / FIG. 11B

INFORMATION TRANSMISSION SYSTEM, INFORMATION OUTPUT APPARATUS, INFORMATION INPUT APPARATUS, AND CONNECTION RELATIONSHIP IDENTIFICATION METHOD

BACKGROUND OF THE INVENTION

1. Field of the Invention

The present invention relates to an information transmission system that is formed by connecting electronic apparatuses by using two kinds of different interfaces, that is, an interface enabling sending and reception of control information such as a digital interface according to the IEEE 1394 standard and an interface enabling transmission of only an information signal such as an analog interface, as well as to an information output apparatus, an information input apparatus, and a connection relationship identification method that are used in such an information transmission system.

2. Description of the Related Art

In recent years, various digital contents have come to be provided abundantly via communication media such as broadcast media and the Internet and via recording media such as the DVD (digital video disc). It is now being considered how to broaden the range of use of digital contents that have come to be provided abundantly and how to prepare an environment in which users can use digital contents conveniently.

For example, it is now being considered to provide a digital interface in electronic equipment generically called audio-visual (AV) equipment such as a monitor receiver and various kinds of reproducing apparatuses, recording apparatuses, recording/reproducing apparatuses, and receiving apparatus. Providing a digital interface in various kinds of electronic equipment in this manner makes it possible to transmit digital contents between various electronic apparatuses and to reproduce or copy digital contents without deteriorating those.

Among a variety of digital interfaces, the IEEE 1394 standard digital interface is now attracting much attention which has been standardized by the IEEE (The Institute of Electrical and Electronics Engineers, Inc. (U.S.)) and enables high-speed transmission of a digital video signal, a digital audio signal, etc. that require real-time processing.

According to the IEEE 1394 standard digital interface, information is transmitted by packet transmission. Providing a high degree of freedom of connection between electronic apparatuses, the IEEE 1394 standard digital interface enables tree wiring, star wiring, daisy chain wiring, etc.

Where electronic apparatuses having an IEEE 1394 standard digital interface are connected to each other in daisy chain form as shown in FIG. 1A, the system is equivalent to a system in which a plurality of electronic apparatuses are connected to a single digital bus as shown in FIG. 1B.

In FIGS. 1A and 1B, an IRD (integrated receiver decoder) 1 is a receiver capable of receiving a digital satellite broadcast etc. DVTRs 3 and 4 are, digital video tape recorders, and a DVD apparatus 4 is a recording/reproducing apparatus, for example, of a DVD (digital video disc).

In the example of FIGS. 1A and 1B, the plurality of electronic apparatuses can send digital data to a common digital bus 6. Digital data that are sent to the digital bus 6 can be distinguished from each other by channel Nos. that are prescribed in the IEEE 1394 standard digital interface.

A node ID for identifying an electronic apparatus as an output source of digital data is described in the header portions of packets that are used for transmission of the digital data. Therefore, by using a channel No. and a node ID, an electronic apparatus to be supplied with digital data can easily receive necessary digital data from a target electronic apparatus.

In the case of the IEEE 1394 standard digital interface, information of a digital input/output terminal of each electronic apparatus is described as plug information or stored by a mechanism called a descriptor in an internal register of a digital interface circuit that is provided in each apparatus. Therefore, each apparatus can manage the connection state by correlating, one-to-one, digital input/output terminals of respective electronic apparatuses with information of the internal register of the self apparatus.

As described above, in the case of the IEEE 1394 standard digital interface, not only specific information (identification information) or the like of an electronic apparatus but also various kinds of control information can be transmitted. Further, it is possible to send digital data to a target electronic apparatus via a common digital bus and to receive digital data from a target electronic apparatus via a common digital bus.

For example, it is now being considered to prepare an environment in which users can use digital contents conveniently by making it possible to easily construct what is called a home network system that enables mutual information exchange by connecting various AV apparatuses, a personal computer, etc. in a home as shown in FIGS. 1A and 1B by using IEEE 1394 standard digital interfaces.

Incidentally, as described above, although various electronic apparatuses have come to be provided with a digital interface, they need to be provided also with a conventional analog interface. This is because not all contents are provided in the form of a digital signal.

For example, conventional analog broadcast is still performed though digital broadcast has come to be performed. As long as only broadcast media are concerned, it is considered that contents will continue to be provided for the time being by both analog signals and digital signals. Further, there is a demand that not only digital contents but also information resources that have been obtained through conventional analog interfaces be kept usable.

For the above-described reasons, one option is to provide various electronic apparatuses with both of an analog interface and a digital interface. In this case, various electronic apparatuses can be connected to each other in a large number as shown in FIGS. 1A and 1B.

For example, it is one option to provide an information input apparatus such as a monitor receiver that accepts input of an information signal such as a video signal from various electronic apparatuses with a plurality of analog input terminals to enable it to accept input from a plurality of electronic apparatuses.

The information input apparatus that is an electronic apparatus connected to a system via an IEEE 1394 standard digital interface is so configured as to be able to reliably receive intended digital data from a target electronic apparatus by, for example, a user's merely specifying the target electronic apparatus to output the intended digital data.

As described above, in the case of the digital interface (serial bus plug) that enables sending and reception of specific information of an electronic apparatus and control information, a connection relationship between electronic apparatuses can be identified clearly by using various kinds of information included in digital data.

In contrast, in an information input apparatus having a plurality of analog input terminals, to perform analog input terminal switching (selection), a user needs to remember what electronic apparatuses are connected to what analog input terminals and manipulate an input switching switch provided on a remote commander, for example, of the information input apparatus based his memory. That is, an analog input terminal to which a target electronic apparatus would be connected is selected by switching among pieces of terminal information stored in the information input apparatus in what is called a toggle method by the user's manipulating the input switching switch.

The reason why it is necessary to rely on a manual manipulation of a user is that an electronic apparatus cannot identify a connection relationship between electronic apparatuses because an analog interface (external plug) is for output or input of only an analog information signal and an analog information signal does not include specific information of an electronic apparatus or control information.

In the above-configured information input apparatus having a plurality of analog input terminals, time and labor are needed to correctly identify an input terminal that should receive an analog signal from a target electronic apparatus. Further, when the information input apparatus having a plurality of analog input terminals is to be supplied with an analog signal from a target electronic apparatus, there may occur a trouble that a wrong electronic apparatus is selected and an analog signal that is different from an intended one is supplied.

SUMMARY OF THE INVENTION

An object of the present invention is to provide an information transmission system capable of clearly identifying a connection relationship of a connection using an interface enabling transmission of only an information signal in a case where electronic apparatuses are connected to each other by using interfaces enabling transmission of only an information signal and interfaces enabling transmission of control information etc., as well as an information output apparatus, an information input apparatus, and a connection relationship identification method that are used in such an information transmission system.

The invention provides an information transmission system in which one or more information output apparatuses that output an information signal and an information input apparatus that accepts input of the information signal from each of the one or more information output apparatuses are connected to each other, wherein each information output apparatus comprises an output terminal for outputting only an information signal; related information sending means for sending at least specific information of an electronic apparatus; and information-for-identification superimposing means for superimposing information for identification to be used for identifying an input terminal of the information input apparatus for accepting input of the information signal on the information signal to be output from the output terminal; and the information input apparatus comprises a plurality of input terminals for accepting input of only the information signal; specific information accepting means for accepting input of the specific information; switching means for switching among the input terminals; information-for-identification detecting means for detecting the information for identification from each of the information signals that are accepted by the respective input terminals by causing the switching means to switch among the input terminals; and identifying means for identifying an input terminal of the information signal from which the information for identification is detected by the information-for-identification detecting means as an input terminal of the information signal sent from an information output apparatus that sent the specific information via the related information sending means.

In this information transmission system, each information output apparatus and the information input apparatus are connected to each other in such a manner that the output terminal for outputting only an information signal is connected to one of the input terminals for accepting input of only an information signal. Specific information is transmitted via, for example, a control signal line (control line) that connects the related information sending means of the information output apparatus and the related information accepting means of the information input apparatus.

Information for identification (information for detection) in a state that it is detectable in the information input apparatus is superimposed by the information-for-identification superimposing means on an information signal to be sent from the output terminal of the information output apparatus and a resulting signal is output. In the information input apparatus, the information for identification that is superimposed on the information signal and supplied via one of the input terminals is detected by the information-for-identification detecting means.

The input terminal that has accepted the input of the information signal from which the information for identification has been detected by the information-for-identification detecting means is identified by the identifying means as an input terminal that is connected to the output terminal of the information output apparatus that sent the specific information.

With the above configuration, in the information input apparatus, an input terminal connected to the output terminal of the information output apparatus can be identified automatically. Therefore, even if information output apparatuses are connected to the respective input terminals of the information apparatus, which information output apparatus is connected to each input terminal can be identified easily and correctly.

The invention also provides an information transmission system in which one or more information output apparatuses that output an information signal and an information input apparatus that accepts input of the information signal from each of the one or more information output apparatuses are connected to each other, wherein each information output apparatus comprises an output terminal for outputting only an information signal; related information sending means for sending at least specific information of an electronic apparatus; and information-for-identification superimposing means for superimposing information for identification to be used in the information input apparatus to notify a user about the information output apparatus that outputs the information signal on the information signal to be output from the output terminal; and the information input apparatus comprises a plurality of input terminals for accepting input of only the information signal; specific information accepting means for accepting input of the specific information; switching means for switching among the input terminals; notifying means for notifying a user about the information for identification that is superimposed on the information signal supplied from an input terminal to which switching is made by the switching means by reproducing the information for, identification; and decision manipulation means for accepting a manipulation of determining an input terminal of the information signal sent from an information output apparatus that sent the specific information.

In this information transmission system, each information output apparatus and the information input apparatus are connected to each other in such a manner that the output terminal for outputting only an information signal is connected to one of the input terminals for accepting input of only an information signal. Specific information is transmitted via, for example, a control signal line (control line) that connects the related information sending means of the information output apparatus and the related information accepting means of the information input apparatus.

Information for identification (information for notification) about which a user is to be notified in the information input apparatus is superimposed by the information-for-identification superimposing means on an information signal to be sent from the output terminal of the information output apparatus and a resulting signal is output. In the information input apparatus, the switching means is controlled by the user, whereby one of the input terminals is selected. If the information for identification is superimposed on the selected information signal, the information for identification is reproduced by the notifying means and the user is notified about it.

When the user is notified by the notifying means about the information for identification, the input terminal that has accepted the input of the information signal on which the information for identification is superimposed is the input terminal connected to the output terminal of the information output apparatus that sent the specific information. Therefore, the input terminal of the information input apparatus connected to the output terminal of the information output apparatus that sent the specific information can be identified by accepting a decision manipulation of the user through the decision manipulation means.

With the above configuration, an input terminal connected to the output terminal of the information output apparatus can be identified in such a manner that a user himself performs a check through the information input apparatus. Therefore, even if information output apparatuses are connected to the respective input terminals of the information apparatus, which information output apparatus is connected to each input terminal can be identified easily and correctly.

The invention also provides an information transmission system in which one or more information output apparatuses that output an information signal and an information input apparatus that accepts input of the information signal from each of the one or more information output apparatuses are connected to each other via a first communication interface for transmission of only an information signal and a second communication interface enabling transmission of an information signal and additional information, wherein each information output apparatus comprises an output terminal for the first communication interface; related information sending means for sending specific information of the self apparatus as additional information to the second communication interface; and information-for-identification superimposing means for superimposing information for identification to be used for identifying an input terminal for the first communication interface of the information input apparatus for accepting input of the information signal on the information signal to be output from the output terminal; and the information input apparatus comprises a plurality of input terminals for the first communication interface; specific information accepting means for accepting input of the specific information that is transmitted via the second communication interface; switching means for switching among the input terminals; information-for-identification detecting means for detecting the information for identification from each of the information signals that are accepted by the respective input terminals for the first communication interface by causing the switching means to switch among the input terminals; and identifying means for identifying an input terminal of the information signal from which the information for identification is detected by the information-for-identification detecting means as an input terminal of the information signal sent from an information output apparatus that sent the specific information via the related information sending means.

In this information transmission system, each information output apparatus and the information input apparatus are connected to each other via the first interface and the second interface. Specific information is transmitted via the second interface that connects the related information sending means of the information output apparatus and the related information accepting means of the information input apparatus.

Information for identification (information for detection) in a state that it is detectable in the information input apparatus is superimposed by the information-for-identification superimposing means on an information signal to be sent from the output terminal of the information output apparatus, and transmitted to the information input apparatus via the first interface. In the information input apparatus, the information for identification that is superimposed on the information signal and supplied via the input terminal is detected by the information-for-identification detecting means.

The input terminal that has accepted the input of the information signal from which the information for identification has been detected by the information-for-identification detecting means is identified by the identifying means as an input terminal that is connected to the output terminal of the information output apparatus that sent the specific information.

With the above configuration, in the information input apparatus, an input terminal connected to the output terminal of the information output apparatus can be identified automatically. Therefore, even if information output apparatuses are connected to the respective input terminals of the information apparatus, which information output apparatus is connected to each input terminal can be identified easily and correctly.

Both of the first interface and the second interface enable transmission of an information signal. For example, where the first interface and the second interface are used while switching is made between them, a proper input terminal can be selected in the information input apparatus by clearly identifying a connection relationship relating to the first interface that enables transmission of only an information signal.

The invention further provides an information transmission system in which one or more information output apparatuses that output an information signal and an information input apparatus that accepts input of the information signal from each of the one or more information output apparatuses are connected to each other via a first communication interface for transmission of only an information signal and a second communication interface enabling transmission of an information signal and additional information, wherein each information output apparatus comprises an output terminal for the first communication interface; related information sending means for sending specific information of the self apparatus as additional information to the second communication interface; and information-for-identification superimposing means for superimposing information for identification to be used in the information input apparatus to notify a user about the information output apparatus that outputs the information signal on the information signal to be output from the output terminal; and the information input apparatus comprises a plurality of input terminals for the first communication interface; specific information accepting means for accepting input of the specific information that is transmitted via the second communication interface; switching means for switching among the input terminals; notifying means for notifying a user about the information for identification that is superimposed on the information signal supplied from an input terminal for the first communication interface to which switching is made by the switching means by reproducing the information for identification; and decision manipulation means for accepting a manipulation of determining an input terminal for the first communication interface of the information signal sent from an information output apparatus that sent the specific information via the second communication interface.

In this information transmission system, each information output apparatus and the information input apparatus are connected to each other via the first interface and the second interface. Specific information is transmitted via the second interface that connects the related information sending means of the information output apparatus and the related information accepting means of the information input apparatus.

Information for identification (information for notification) about which a user is to be notified in the information input apparatus is superimposed by the information-for-identification superimposing means on an information to be supplied from the output terminal of the information output apparatus to the information input apparatus via the first interface and a resulting signal is output. In the information input apparatus, the switching means is controlled by the user, whereby one of the input terminals is selected. If the information for identification is superimposed on the selected information signal, the information for identification is reproduced by the notifying means and the user is notified about it.

When the user is notified by the notifying means about the information for identification, the input terminal that has accepted the input of the information signal on which the information for identification is superimposed is the input terminal connected to the output terminal of the information output apparatus that sent the specific information. Therefore, the input terminal of the information input apparatus connected to the output terminal of the information output apparatus that sent the specific information can be identified by accepting a decision manipulation of the user through the decision manipulation means.

With the above configuration, an input terminal connected to the output terminal of the information output apparatus can be identified in such a manner that a user himself performs a check through the information input apparatus. Therefore, even if information output apparatuses are connected to the respective input terminals of the information apparatus, which information output apparatus is connected to each input terminal can be identified easily and correctly.

Both of the first interface and the second interface enable transmission of an information signal. For example, where the first interface and the second interface are used while switching is made between them, a proper input terminal can be selected in the information input apparatus by clearly identifying a connection relationship relating to the first interface that enables transmission of only an information signal.

In the above information transmission system, the information input apparatus may further comprise connection management information recording means for recording input terminal identification information indicating the input terminal identified by the identifying means and the specific information of the information output apparatus in an connection management memory in such a manner that they are correlated with each other.

In this configuration, information terminal identification information indicating the input terminal identified by the identifying means and the specific information of the information output apparatus are stored in the connection management memory of the information input apparatus in such a manner as to be correlated with each other and then managed. With this measure, which input terminal of the information input apparatus is connected to which information output apparatus can be recognized by, for example, inquiring the information of the connection management memory.

In the above information transmission system, the information input apparatus may further comprise connection management information recording means for recording, when the decision manipulation means accepts the deciding manipulation, input terminal identification information indicating the input terminal to which switching is made by the switching means and the specific information of the information output apparatus in an connection management memory in such a manner that they are correlated with each other.

In this configuration, when a deciding manipulation is accepted through the decision manipulation means, an input terminal selected by the switching means is identified and input terminal identification information indicating the identified input terminal and the specific information of the information output apparatus are stored in the connection management memory of the information input apparatus in such a manner as to be correlated with each other and then managed. With this measure, which input terminal of the information input apparatus is connected to which information output apparatus can be recognized by, for example, inquiring the information of the connection management memory.

In the above information transmission system, the information output apparatus may send, to the information input apparatus, via the related information sending means, a switching control signal including the specific information of the self apparatus and to be used for making switching to the input terminal of the information input apparatus that is connected to the output terminal of the self apparatus before outputting the information signal via the output terminal.

In this configuration, the information output apparatus sends an input terminal switching control signal including the specific information of the self apparatus before outputting an information signal via the output terminal of the self apparatus. With this measure, the information input apparatus can automatically select a proper input terminal based on the switching control signal supplied from the information output apparatus before receiving an information signal from the information output apparatus via the input terminal.

The above information transmission system may be configured in such a manner that the information output apparatus further comprises connection management information supply request generating means for generating a request for supplying connection management information stored in the connection management memory of the information input apparatus in which the input terminal identification information and the specific information of the information output apparatus are correlated with each other; and switching control signal generating means for generating a switching control signal to be used for making switching to the input terminal of the information input apparatus that is connected to the output terminal of the self apparatus based on the connection management information that is supplied from the information input apparatus in response to the connection management information supply request; and that before outputting an information signal via the output terminal, the information output apparatus sends, via the related information sending means, the connection management information supply request and the switching control signal generated by the switching control signal generating means.

In this configuration, the information output apparatus sends a connection management information supply request to the information input apparatus before outputting an information signal via the output terminal, and generates, based on information supplied from the information input apparatus in response to the supply request, a switching control signal to be used for selecting an input terminal of the information input apparatus connected to the output terminal of the self apparatus (information output apparatus). The switching control signal is sent to the information input apparatus.

With this measure, the information input apparatus can automatically select a proper input terminal based on the switching control signal supplied from the information output apparatus before receiving an information signal from the information output apparatus via the input terminal.

The above information transmission system may be configured in such a manner that the information output apparatus further comprises input terminal identification information receiving means for receiving input terminal identification information of the input terminal identified by the identifying means; and connection management information recording means for recording the input terminal identification information received by the input terminal identification information receiving means in a connection management memory; and that before outputting an information signal via the output terminal, the information output apparatus causes the related information sending means to send the information input apparatus the input terminal identification information stored in the connection management memory.

In this configuration, input terminal identification information indicating the input terminal that is connected to the output terminal of the information output apparatus and that has been identified in the information input apparatus is supplied from the information input apparatus to the information output apparatus. And the input terminal identification information is stored in the connection management memory of the information output apparatus and then managed. The input terminal identification information stored in the connection management memory is supplied to the information input apparatus before an information signal is output via the output terminal.

With this measure, by inquiring the information stored in the connection management memory of the information output apparatus, the information output apparatus can recognize which input terminal of the information input apparatus the output terminal of the self apparatus is connected to. Before outputting an information signal via the output terminal, the information output apparatus supplies the information input apparatus with input terminal identification information indicating the input terminal of the information input apparatus connected to the output terminal of the self apparatus. Therefore, the information input apparatus can automatically select a proper input terminal based on the input terminal identification information supplied from the information output apparatus before receiving an information signal via the input terminal.

The above information transmission system may be configured in such a manner that the information output apparatus further comprises input terminal identification information receiving means for receiving input terminal identification information indicating the input terminal to which switching is made by the switching means when the decision manipulation means accepts the deciding manipulation; and connection management information recording means for recording the input terminal identification information received by the input terminal identification information receiving means in a connection management memory; and that before outputting an information signal via the output terminal, the information output apparatus causes the related information sending means to send the information input apparatus the input terminal identification information stored in the connection management memory.

In this configuration, input terminal identification information indicating the input, terminal that is connected to the output terminal of the information output apparatus and that has been identified in the information input apparatus is supplied from the information input apparatus to the information output apparatus via the second interface. And the input terminal identification information is stored in the connection management memory of the information output apparatus and then managed. The input terminal identification information stored in the connection management memory is supplied to the information input apparatus before an information signal is output via the output terminal.

With this measure, by inquiring the information stored in the connection management memory of the information output apparatus, the information output apparatus can recognize which input terminal of the information input apparatus the output terminal of the self apparatus is connected to. Before outputting an information signal via the output terminal, the information output apparatus supplies the information input apparatus with input terminal identification information indicating the input terminal of the information input apparatus connected to the output terminal of the self apparatus. Therefore, the information input apparatus can automatically select a proper input terminal based on the input terminal identification information supplied from the information output apparatus before receiving an information signal via the input terminal.

In the above information transmission system, the information-for-identification sending means of the information output apparatus may superimpose a display message on the information signal in a case where the information signal is a video signal.

In this configuration, a display message is used as the information for identification. With this measure, when the display message is reproduced and a user is notified about it, based on the display message the user can judge that the input terminal that is currently selected in the information input apparatus is accepting input of an information that is supplied from the information output apparatus that sent the specific information and for which an input terminal should be identified.

In the above information transmission system, the information-for-identification sending means of the information output apparatus may superimpose a voice message on the information signal in a case where the information signal is an audio signal.

In this configuration, a voice message is used as the information for identification. With this measure, when the voice message is reproduced and a user is notified about it, based on the voice message the user can judge that the input terminal that is currently selected in the information input apparatus is accepting input of an information that is supplied from the information output apparatus that sent the specific information and for which an input terminal should be identified.

The above information transmission system may be configured in such a manner that the information-for-identification superimposing means of the information output apparatus superimposes pattern information that is predetermined as the information for identification on the information signal as information for detection; and that the information-for-identification detecting means of the information input apparatus detects the pattern information superimposed on the information signal.

In this configuration, predetermined pattern information is superimposed on an information signal and detected in the information input apparatus. With this measure, when the pattern information is detected, it can be judged automatically that the input terminal that has accepted input of the information signal on which the pattern information is superimposed is accepting input of an information signal supplied from the information output apparatus that sent the specific information and for which an input terminal should be identified.

The above information transmission system may be configured in such a manner that the information output apparatus further comprises start request receiving means for receiving a request for starting processing of identifying an input terminal that is sent from the information input apparatus; that the related information sending means sends the specific information when the start request receiving means receives the start request; that the information-for-identification superimposing means superimposes the information for identification on the information signal when the start request receiving means receives the start request; and that the information input apparatus further comprises detecting means for detecting whether connection management information in which the input terminal identification information and the specific information of the information output apparatus are correlated with each other is stored in the connection management memory of the self apparatus; and start request sending means for sending the start request when the detecting means detects that connection management information is not stored.

In this configuration, processing of identifying an input terminal of the information input apparatus connected to the output terminal of the information output apparatus is started if information is not stored in the connection management memory of the information input apparatus. With this measure, the processing of identifying an input terminal can necessarily be performed if input terminal identification information and specific information of the information output apparatus have not been managed in the information input apparatus yet.

The above information transmission system may be configured in such manner that the information output apparatus further comprises detecting means for detecting whether the input terminal identification information is stored in the connection management memory of the self apparatus; that the related information sending means sends the specific information when the detecting means detects that the input terminal identification information is not stored; and that the information-for-identification superimposing means superimposes the information for identification on the information signal when the detecting means detects that the input terminal identification information is not stored.

In this configuration, processing of identifying an input terminal of the information input apparatus connected to the output terminal of the information output apparatus is started if information is not stored in the connection management memory of the information output apparatus. With this measure, the processing of identifying an input terminal can necessarily be performed if input terminal identification information has not been managed in the information output apparatus yet.

The above information transmission system may be configured in such a manner that the information output apparatus further comprises manipulation means for accepting a start instruction input that commands start of processing of identifying an input terminal of the information input apparatus that is connected to the output terminal of the self apparatus; the related information sending means sends the specific information when the manipulation means accepts the start instruction input; and that the information-for-identification superimposing means superimposes the information for identification on the information signal when the manipulation means accepts the start instruction input.

In this configuration, processing of identifying an input terminal of the information input apparatus connected to the output terminal of the information output apparatus is performed when a user makes an instruction. With this measure, the user can cause the processing of identifying an input terminal of the information input apparatus connected to the output terminal of the information output apparatus any time when necessary.

The above information transmission system may be configured in such a manner that the information output apparatus further comprises start request receiving means for receiving a start request for start of processing of identifying an input terminal that is sent from the information input apparatus; that the specific information sending means sends the specific information when the start request receiving means receives the start request; that the information-for-identification superimposing means superimposes the information for identification on the information signal when the start request receiving means receives the start request; and that the information input apparatus further comprises connection change detecting means for detecting a connection change in any of the input terminals of the self apparatus; and start request sending means for sending the start request when the connection change detecting means detects a connection change in any of the input terminals.

In this configuration, processing of identifying an input terminal of the information input apparatus connected to the output terminal of the information output apparatus is performed when a connection change in any of the input terminals such as attachment or detachment of a plug to or from any of the input terminals is detected in the information input apparatus.

With this measure, when a connection relationship relating to the information input apparatus is changed, the processing of identifying an input terminal of the information input apparatus connected to the output terminal of the information output apparatus is performed necessarily and the connection relationship can be identified correctly and then managed.

In the above information transmission system, the output terminal of the information output apparatus and an input terminal of the information input apparatus may be connected to each other via a communication interface for an analog signal.

In this configuration, an analog connection relationship between the information output apparatus and the information input apparatus can be identified correctly.

In the above information transmission system, the first communication interface may be an analog interface and the second communication interface may be a digital interface.

In this configuration, an analog connection relationship between the information output apparatus and the information input apparatus can be identified correctly by using the digital interface.

BRIEF DESCRIPTION OF THE DRAWINGS

FIGS. 6A and 6B show specific information and terminal information of an apparatus that are held by each of the IRD shown in FIG. 2 and the monitor receiver shown in FIG. 3;

FIG. 8 is a block diagram of another exemplary monitor receiver as the information input apparatus according to the invention;

FIGS. 11A and 11B show a process for identifying and managing an input terminal of the monitor receiver connected to the output terminal of the IRD that is executed through cooperation between the IRD shown in FIG. 9 and the monitor receiver shown in FIG. 10;

DETAILED DESCRIPTION OF THE PREFERRED EMBODIMENTS

Embodiments of the information transmission system, information output apparatus, information input apparatus, and connection relationship identification method according to the invention will be hereinafter described with reference to the drawings. The following embodiments are directed to a case where an information transmission system to which the connection relationship identification method according to the invention is applied is applied to a home network system that is formed in a home by connecting electronic apparatuses such as AV apparatuses to each other.

Embodiment 1

[Outline and Connection Relationships of Home Network System]

Figure 2:
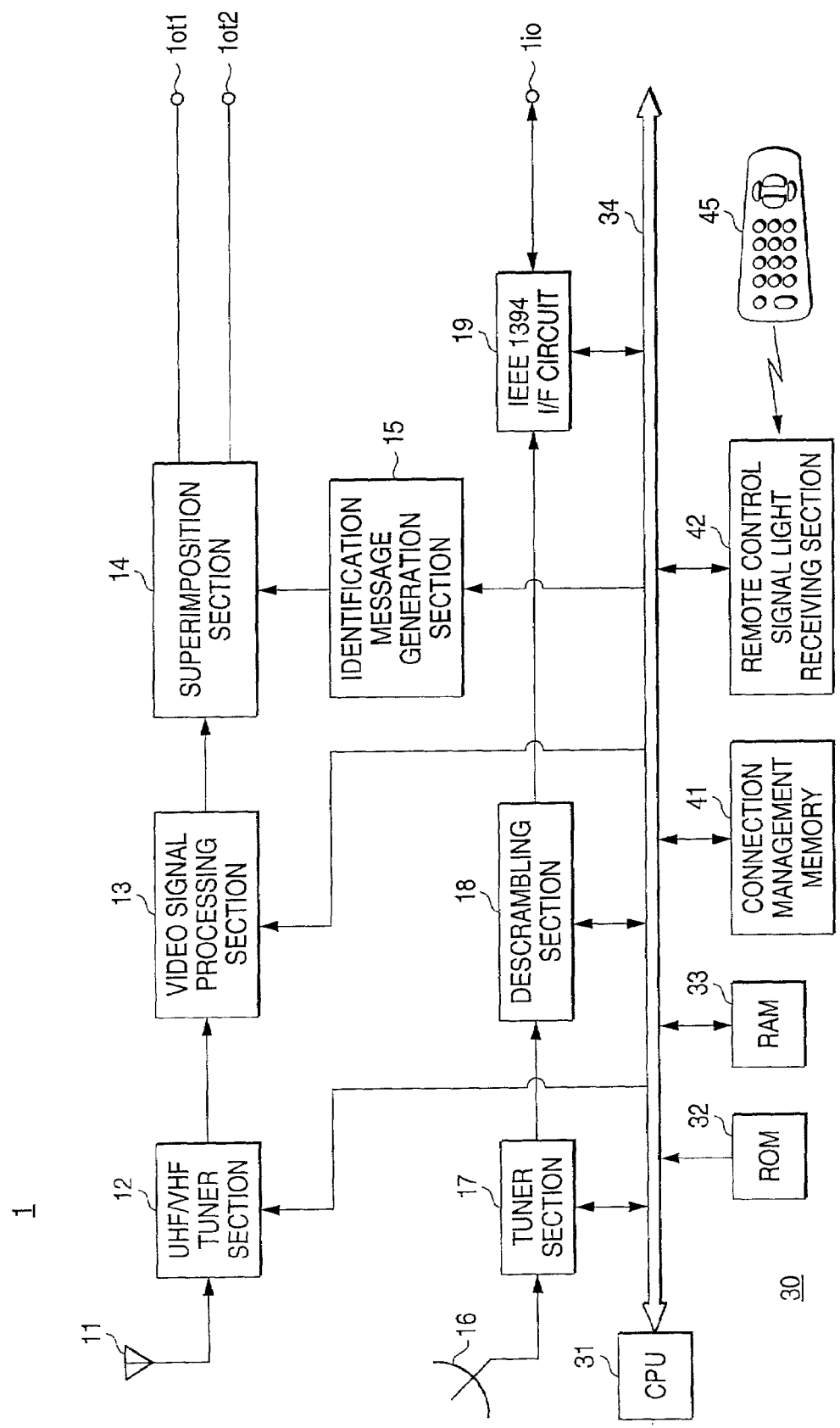
FIG. 2 is a block diagram of a receiver called an IRD (integrated receiver decoder) to which an embodiment of the information output apparatus according to the present invention is applied.
Figure 3:
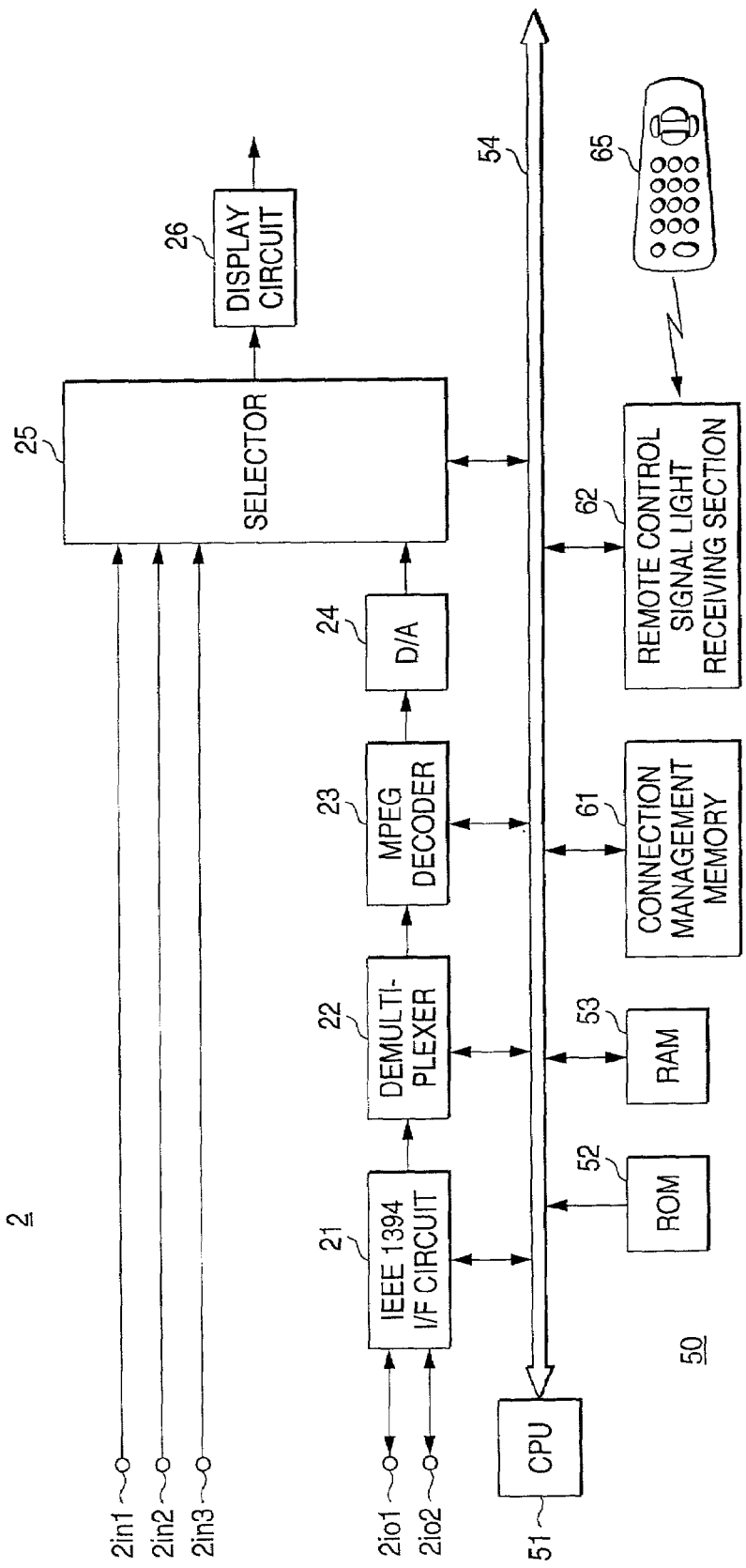
FIG. 3 is a block diagram of a monitor receiver to which an embodiment of the information input apparatus according to the invention is applied.

FIG. 2 is a block diagram of an IRD 1 according to a first embodiment to which the information output apparatus according to the invention is applied. FIG. 3 is a block diagram of a monitor receiver 2 according to the first embodiment to which the information input apparatus according to the invention is applied.

In the first embodiment, a home network system according to the invention is realized by using the IRD 1 and the monitor receiver 2 that are shown in FIGS. 2 and 3, respectively, and other apparatuses. Therefore, before describing the details of the individual apparatuses such as the IRD 1 and the monitor receiver 2 that form the home network system, the outline and the connection relationships of the home network system according to the first embodiment will be described first.

Figure 4:
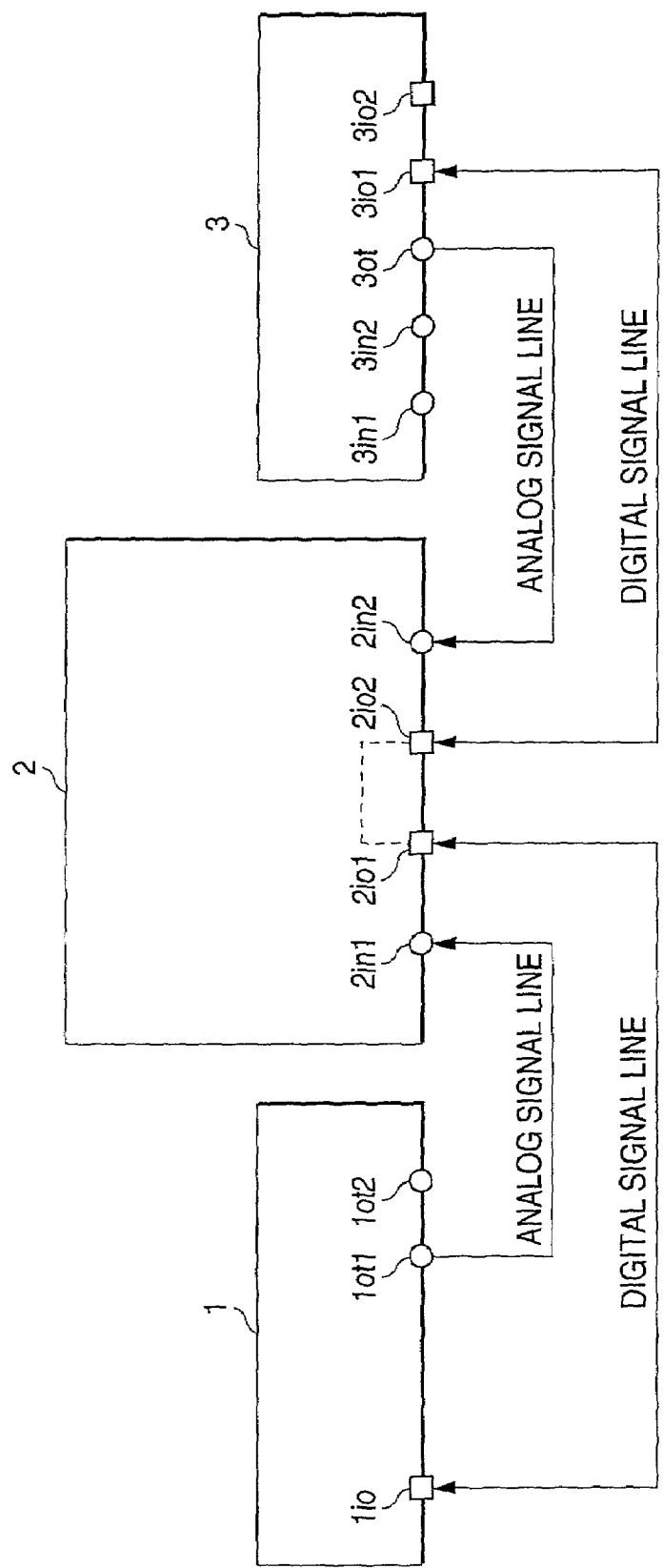
FIG. 4 shows an exemplary home network system according to the invention that is formed by the information output apparatus and the information input apparatus according to the invention.
Figure 5:
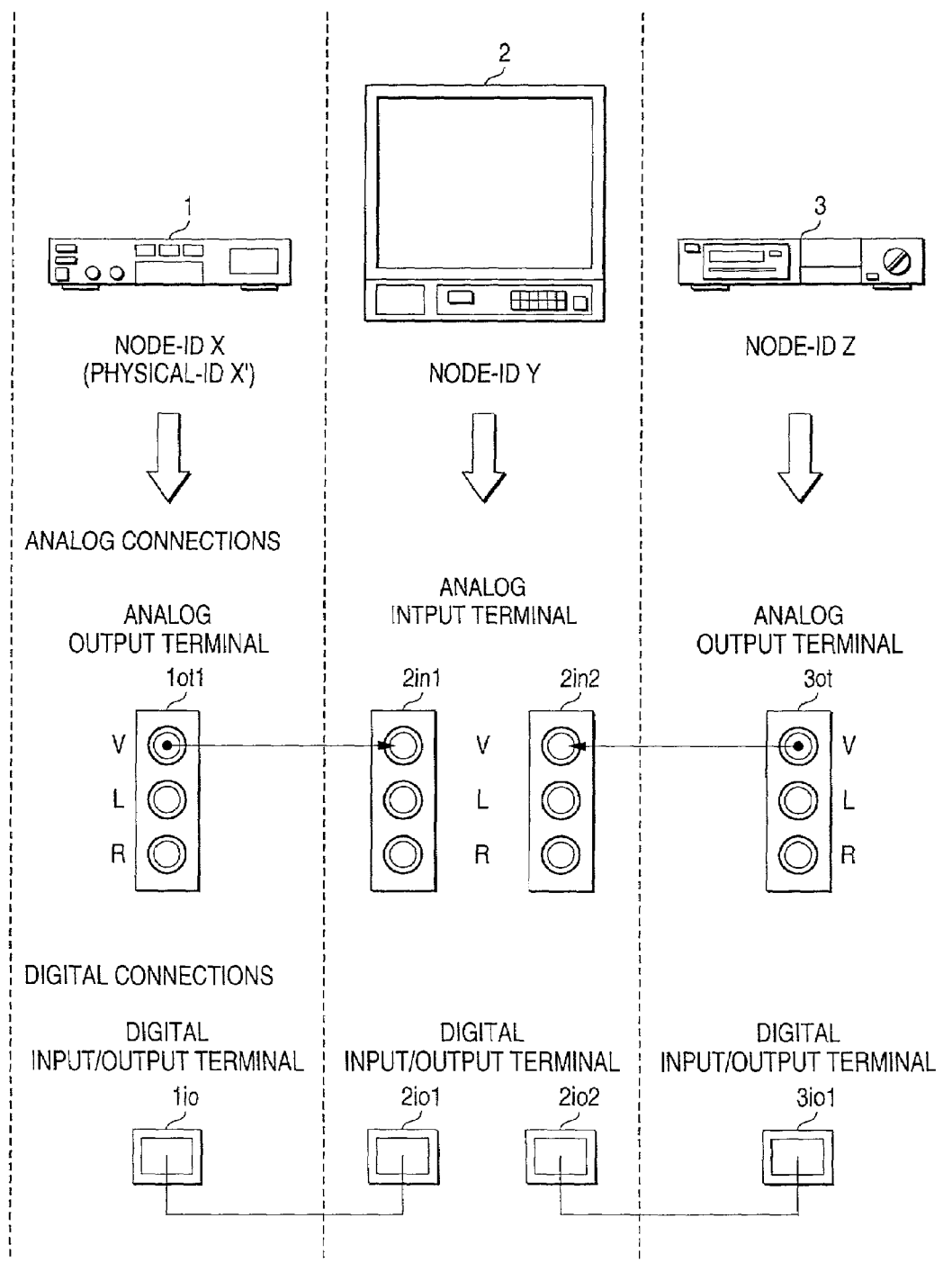
FIG. 5 shows connection relationships of the home network system shown in FIG. 4.

FIGS. 4 and 5 show an outline and a connection relationship of the home network system according to the first embodiment. As shown in FIG. 3, the home network system according to the first embodiment formed in such a manner that the IRD 1 and a DVTR 3 to which the information output apparatus according to the invention is applied and the monitor receiver 2 to which the information input apparatus according to the invention are connected to each other via two kinds of interfaces, that is, a first interface and a second interface.

In the first embodiment, an analog interface for transmission of only information signals such as a video signal and audio signals is used as the first interface and an IEEE 1394 standard digital serial interface enabling transmission of not only information signals such as a video signal, an audio signal, and computer data but also specific information of an electronic apparatus and control information is used as the second interface.

In the first embodiment, as shown in FIG. 4, the IRD 1 has an IEEE 1394 standard digital input/output terminal 1$io$ and analog output terminals 1$ot$1 and 1$ot$2. The monitor receiver 2 has IEEE 1394 standard digital input/output terminals 2$io$1 and 2$io$2 and analog input terminals 2$in$1 and 2$in$2 as well as an analog input terminal 2$in$3 (not shown in FIG. 4). The DVTR 3 has digital input/output terminals 3$io$1 and 3$io$2, an analog output terminal 3$ot$, and analog input terminals 3$in$1 and 3$in$2.

In the first embodiment, as shown in FIG. 5, each of the analog output terminal and the analog input terminal has an output or input terminal (V terminal) for a video signal, an output or input terminal (L terminal) for a left-channel audio signal, and an input or output terminal (R terminal) for a right-channel audio signal and can output or accept input of an analog video signal and analog audio signals.

As shown in FIGS. 4 and 5, in the first embodiment, between the IRD 1 and the monitor receiver 2, the analog output terminal 1*ot*1 and the analog input terminal 2*in*1 are connected to each other and the digital input/output terminal 1*io* and the digital input/output terminal 2*io*1 are connected to each other. Between the DVTR 3 and the monitor receiver 2, the analog output terminal 3*ot* and the analog input terminal 2*in*2 are connected to each other and the digital input/output terminal 3*io*1 and the digital input/output terminal 2*io*2 are connected to each other.

As described above, in the first embodiment, the IRD 1 and the monitor receiver 2 are connected to each other via not only an analog signal line but also a digital signal line and the same is true of the monitor receiver 2 and the DVTR 3. In the first embodiment, as shown in FIGS. 4 and 5, no signal line is directly connected to the IRD 1 or the DVTR 3. However, even in the first embodiment, the IRD 1, the monitor receiver 2, and the DVTR 3 are connected to each other via the IEEE 1394 standard digital interfaces.

Figure 1A:
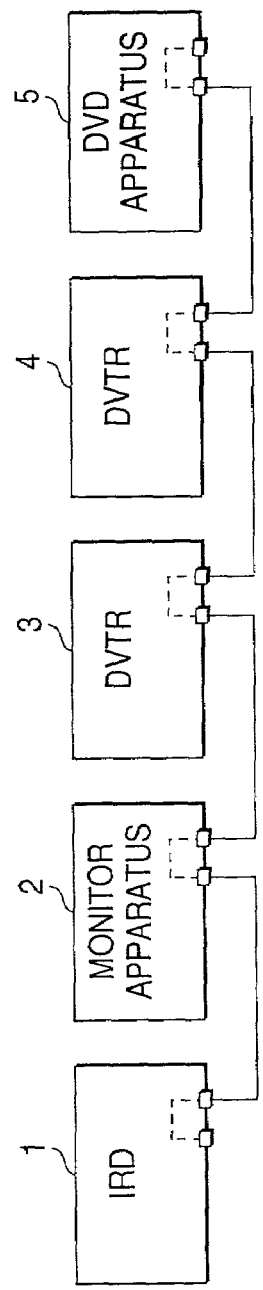
FIGS. 1A and 1B show an exemplary home network system in which digital connections and analog connections exist in mixed form.

This is explained as follows. As described above with reference to FIGS. 1A and 1B, the IRD 1, the monitor receiver 2, and the VDTR 3 are individually connected to a common digital bus (IEEE 1394 standard digital bus) and can mutually exchange a signal via the digital bus. That is, as described above, a system in which electronic apparatuses are connected to each other via IEEE standard digital signal lines is equivalent to a system in which they are connected to each other via a single digital bus. Therefore, in the following description, a digital signal line will be called a digital bus.

In transmitting an information signal via an IEEE 1394 standard digital interface, each electronic apparatus sends it after packeting it. In this case, as described above, each packet is transmitted in such a manner that a channel No. and specific information of an electronic apparatus that enables identification of an electronic apparatus that has sent the packet, such a node ID indicating a transmission source (output source) electronic apparatus of the packet, is added to the header portion of the packet.

With the above measure, an electronic apparatus connected to the common digital bus can receive only an information signal that has been sent from a target electronic apparatus in the form of packets. In the case of the IEEE 1394 standard digital interface, not only an information signal but also control information to be used for controlling an electronic apparatus connected to the common digital bus can be sent.

As described above, the IEEE 1394 standard digital interface is so designed as to make it possible to exchange information signal packets of a video signal, an audio signal, or the like between electronic apparatuses connected to the common serial bus as well as to exchange various kinds of control information; for example, an electronic apparatus that is to receive an information signal can request an electronic apparatus that is to send the information signal to set a communication channel.

In this embodiment, as described later, the IRD 1 as an information output apparatus can receive and tune in to either of analog TV broadcast and a digital TV broadcast in which a plurality of MPEG-encoded TV programs are multiplexed.

That is, the IRD 1 can demodulate an analog TV signal that has been received and tuned in and output it from the analog output terminals 1*ot*1 or 1*ot*2 in accordance with a user's instruction that is supplied via a remote commander of the self apparatus. Further, the IRD 1 can perform descrambling for canceling scrambling (coding) that was performed on a received and tuned-in digital TV broadcast signal and output a resulting signal from the digital input/output terminal 1*io* in accordance with a user's instruction that is supplied via the remote commander of the self apparatus.

In the first embodiment, in accordance with a user's instruction, the DVTR 3 as an information output apparatus can convert a video signal or an audio signal recorded digitally on a recording medium into an analog signal and output it via the analog output terminal 3*ot* or output, as it is, a digital video signal or a digital audio signal recorded digitally on a recording medium via the digital input/output terminal 3*io*1 or 3*io*2.

Further, the DVTR 3 can record, as it is, on a recording medium, a digital signal that is supplied via the digital input/output terminal 3*io*1 or 3*io*2, and can convert an analog signal supplied via the analog input terminal 3*in*1 or 3*in*2 into a digital signal and record it on a recording medium after subjecting it to MPEG data compression, for example.

In the first embodiment, the monitor receiver 2 as the information input apparatus according to the first embodiment can switch, among the three analog input terminals 2*in*1, 2*in*2, and 2*in*3, the analog input terminal via which an analog signal to be processed is supplied or switch, between the digital input/output terminals 2*io*1 and 2*io*2, the digital input/output terminal via which a digital signal to be processed is supplied.

As described above, in the home network system according to the first embodiment, the IRD 1 and the DVTR 3 are connected to the monitor receiver 2 both in analog form and digital form. Each of the IRD 1, the monitor receiver 2, and the DVTR 3 that constitute the home network system according to the first embodiment holds a node ID assigned to the self apparatus in a register of an IEEE 1394 I/F circuit (described later), for example, by a function of the IEEE 1394 standard digital interface and also holds terminal information (plug Nos.) or the like to be used for identifying external terminals of the self apparatus in a ROM of a control section of the self apparatus, for example.

FIGS. 6A and 6B show specific information and terminal information of the self apparatus that are held by each of the IRD 1 and the monitor receiver 2 according to the first embodiment. As shown in FIGS. 6A and 6B, each of the IRD 1 and the monitor receiver 2 holds a node ID as the specific information of the self apparatus. In the first embodiment, the node IDs assigned to the IRD 1 and the monitor receiver 2 are "X" and "Y," respectively.

As shown in FIG. 6A, the IRD 1 has two external terminals (external plugs A and B) and holds information indicating that they are analog output terminals. Similarly, as shown in FIG. 6B, the monitor receiver 2 has three external terminals (external plugs A, B, and C) and holds information indicating that they are analog input terminals. "External plug A," "external plug B," and "external plug C" are pieces of terminal information (plug Nos.).

As described above, the IRD 1 holds the pieces of terminal information that correspond to its own analog output terminals one to one and the monitor receiver 2 holds the pieces of terminal information that correspond to its own analog input terminals one to one.

In the first embodiment, analog connection relationships between the electronic apparatuses can be identified by not only using specific information and terminal information of each electronic apparatus held by itself as described above but also utilizing a function of the digital interface. Further, a control of selecting among the analog input terminals of an information input apparatus can be performed by managing the identified analog connection relationships.

[Individual Electronic Apparatuses Constituting Home Network System]

Next, a process of identifying and managing an analog connection relationship between an input output apparatus and an information input apparatus that can be performed by the home network system according to the first embodiment will be described by an example process that is executed between the IRD 1 and the monitor receiver 2. Although each of the IRD 1, the monitor receiver 2, and the DVTR 3 according to the first embodiment can process a video signal and an audio signal, for the sake of simplicity descriptions for processing on an audio signal system performed in each apparatus will be omitted in the following.

[IRD]

First, the IRD 1 that is an information output apparatus of the home network system according to the first embodiment will be described with reference to the block diagram of FIG. 2. As described above, the IRD 1 according to the first embodiment has a function of receiving and tuning in to an analog TV broadcast and a function of receiving and tuning in to a digital TV broadcast.

That is, in FIG. 2, an analog TV broadcast reception antenna (hereinafter referred to as "analog antenna") 11, a UHF/VHF tuner section (hereinafter referred to as "analog tuner section") 12, a video signal processing section 13, a superimposition section 14, and an identification message generation section 15 are sections for handling an analog TV broadcast signal.

A digital TV broadcast reception antenna (hereinafter referred to as "digital antenna") 16, a digital TV broadcast tuner section (hereinafter referred to as "digital tuner") 17, a descrambling section 18, and an IEEE 1394 I/F circuit 19 are sections for handling a digital TV broadcast signal.

The IRD 1 is provided with a control section 30 for controlling the individual sections of the IRD 1. The control section 30 is a microcomputer in which a CPU 31, a ROM 32, and a RAM 33 are connected to each other via a CPU bus 34. A connection management memory 41 for storing information relating to analog connection relationships between electronic apparatuses and a remote control signal light receiving section 42 are connected to the control section 30 of the IRD 1.

The remote control signal light receiving section 42 receives a remote control signal (infrared signal) coming from a remote commander 45 of the IRD 1, converting it into an electrical signal, and supplies the electrical signal to the control section 30. As described above, the IRD 1 has the analog output terminals 1*ot*1 and 1*ot*2 and the digital input/output terminal 1*io* of the IEEE 1394 standard digital interface.

An analog TV broadcast signal received by the analog antenna 11 is supplied to the analog tuner section 12. The analog tuner section 12 tunes in to and demodulates a target analog TV broadcast and supplies a resulting signal to the video signal processing section 13 in accordance with a tuning control signal supplied from the control section 30. The tuning control signal supplied from the control section 30 is generated in the control section 30 in accordance with a user's tuning instruction that is input to the IRD 1 via the remote commander 45 and the remote control signal light receiving section 42.

The video signal processing section 13 processes the received video signal and forms an output video signal. The output video signal formed by the video signal processing section 13 is output to the outside via the superimposition section 14 and the analog output terminal 1*ot*1 or 1*ot*2 and supplied to the monitor receiver 2 in the first embodiment.

In the first embodiment, the superimposition section 14 and the identification message generation section 15 realize a function of an information-for-identification sending means for sending information for identification to be used when the monitor receiver 2 identifies its analog input terminal to which the analog output terminal of the IRD 1 is connected.

When the IRD 1 according to the first embodiment has received, from a user, via the remote commander 45, an instruction input that instructs the IRD 1 to perform processing of identifying an analog terminal of the monitor receiver 2 to which the analog output terminal of the IRD 1 is connected, the identification message generation section 15 generates a display message as information for identification to be used for identifying an analog terminal of the monitor receiver 2 connected to the analog output terminal of the IRD 1.

That is, in the first embodiment, the information for identification is generated as a display message that can be recognized by a user when displayed on the display screen of the display device of the monitor receiver 2, and then supplied to the superimposition section 14. The superimposition section 14 superimposes the identification display message supplied from the identification message generation section 15 on a video signal that is supplied from the video signal processing section 13. As described above, the video signal on which the identification display message is superimposed is output from the superimposition section 14 via the analog output terminal 1*ot*1 or 1*ot*2.

In this embodiment, the identification display message that is generated by the identification message generation section 15 of the IRD 1 is a message such as "This image is being output from the IRD. When this message is displayed, please push the decision button switch of the IRD." that allows a user to recognize that an analog input terminal that has accepted supply of an analog video signal from the IRD 1 has been identified and that commands the next manipulation.

The identification display message is not supplied to the superimposition section 14 unless processing of identifying an analog input terminal of the information input apparatus to which the analog output terminal of the information output apparatus is being performed in response to a user's instruction. With this measure, since the identification display message is not superimposed on an output video signal when processing of identifying an analog input terminal is not being performed, the identification display message is prevented from being superimposed on an output video signal unnecessarily.

On the other hand, a digital TV broadcast signal received by the digital antenna 16 is supplied to the digital tuner section 17. Like the above-described analog tuner section 12, the digital tuner section 17 tunes in to and demodulates a target digital TV broadcast signal and supplies a resulting signal to the descrambling section 18 in accordance with a tuning control signal supplied from the control section 30.

The descrambling section 18 cancels scrambling (coding) that was performed on the demodulated digital broadcast signal. The scrambling-canceled digital broadcast signal is supplied to the IEEE 1394 I/F circuit 19. The IEEE 1394 I/F circuit 19 forms packeted digital data to be sent to the IEEE 1394 standard digital bus, receives digital data supplied from each electronic apparatus, and performs other processing.

When the IRD 1 according to the first embodiment has received, from the remote commander 45, a user's instruction input that commands identification of an analog input terminal of the information input apparatus connected to the analog output terminal of the IRD 1, the control section 30 generates an identification start request for starting processing of identifying an analog input terminal and sends it to the information input apparatus by outputting it to the digital bus via the IEEE 1394 I/F circuit 19 and the digital input/output terminal 1io.

At the same time, the control section 30 controls the identification message generation section 15 to make it generate an identification display message. The control section 30 supplies the generated identification display signal to the information input apparatus by outputting it via the analog output terminal 1ot1 or 1ot2.

In response, the monitor receiver 2 as the information input apparatus (described later) performs processing of identifying an analog input terminal of itself that is connected to the analog output terminal of the IRD 1. If the monitor receiver 2 has identified its analog input terminal that is connected to the analog output terminal of the IRD 1, terminal information indicating the identified analog input terminal is sent to the digital bus via an IEEE 1394 I/F circuit 21 of the monitor receiver 2 as input terminal identification information.

Receiving, via the IEEE 1394 I/F circuit 19, the input terminal identification information supplied from the monitor receiver 2, the IRD 1 correlates the input terminal identification information with the specific information of the monitor receiver 2 and its own output terminal information (i.e., terminal information of the IRD 1 side) and stores and holds resulting information in the connection management memory 41 of the IRD 1 as connection management information. In this manner, the IRD 1 itself can manage the analog connection relationship between the self apparatus and the information input apparatus.

The specific information of the monitor receiver 2 is the node ID, for example, of the monitor receiver 2 which is included in the header portion of input terminal identification information that is sent as packets via the digital bus.

[Monitor Receiver]

Next, the monitor receiver 2 that is an information input apparatus of the home network system according to the first embodiment will be described with reference to the block diagram of FIG. 3. As shown in FIG. 3, the monitor receiver 2 according to the first embodiment has the analog input terminals 2in1, 2in2, and 2in3 and the digital input/output terminals 2io1 and 2io2.

To process a digital information signal supplied from the IRD 1 or the DVTR 3, an IEEE 1394 I/F circuit 21, a demultiplexer 22, an MPEG decoder 23, a D/A (digital-to-analog) conversion circuit 24, a selector 25, and a display circuit 26 are provided.

The monitor receiver 2 is provided with a control section 50 for controlling the individual sections of the monitor receiver 2. The control section 50 is a microcomputer in which a CPU 51, a ROM 52, and a RAM 53 are connected to each other via a CPU bus 54. A connection management memory 61 for storing information relating to analog connection relationships among electronic apparatuses and a remote control signal light receiving section 62 are connected to the control section 50 of the monitoring receiver 2.

The remote control signal light receiving section 62 receives a remote signal (infrared signal) coming from a remote commander 65 of the monitor receiver 2, converting it into an electrical signal, and supplies the electrical signal to the control section 50.

In the monitor receiver 2, analog video signals that are input via the analog input terminal 2in1, 2in2, and 2in3 are supplied to the selector 25. Digital information signals such as digital video signals that are input from the IRD 1 and the DVTR 3 via the digital input/output terminal 2io1 and 2io2 are captured by the IEEE 1394 I/F circuit 21 and supplied to the demultiplexer 22.

The IEEE 1394 I/F circuit 21 can extract information such as a node ID of an output source electronic apparatus that is added to the header portions, for example, of received packets that are directed to the self apparatus and supply it to the control section 50, and can extract necessary information from control information packets and supply it to the control section 50. Controlled by the control section 50, the IEEE 1394 I/F circuit 21 can generate control information packets and send those to the digital bus via the digital input/output terminal 2io1 or 2io2.

When a received digital information signal is a signal in which a plurality of broadcast programs, an EPG (electronic program guide), etc. are multiplexed, the demultiplexer 13 extracts a broadcast program or the EPG corresponding to a user's instruction based on a control signal supplied from the control section 50 in accordance with a user's selection instruction input and supplies it to the MPEG decoder 23.

The MPEG decoder 14 expands (MPEG-decodes) the digital video signal of the received broadcast program, restores a pre-compression digital video signal, and supplies the restored digital video signal to the D/A conversion section 24. The D/A conversion section 24 converts the received digital video signal into an analog video signal and supplies it to the selector 25.

As described above, analog video signals supplied via that are supplied as digital signals via the digital input/output terminal 2io1 and 2io2, MPEG-decoded, and then converted into analog signals are supplied to the selector 16. Controlled by the control section 50, the selector 16 switches the analog video signal to be output among analog video signals supplied via the three respective analog input terminals 2in1, 2in2, and 2in3 and an analog video signal supplied from the D/A conversion section 24.

That is, a user makes, through the remote commander 65 of the monitor receiver 2, an instruction input specifying one of the analog input terminals 2in1, 2in2, and 2in3 and the digital input/output terminals 2io1 and 2io2 an image of a video signal supplied via which should be displayed. A remote control signal corresponding to the user's instruction input is output from the remote commander 65.

The remote control signal is received by the remote control signal light receiving section 62 that is connected to the control section 50 and the received signal is converted into an electrical signal, which is supplied to the control section 50. The control section 50 generates, in accordance with the signal that is supplied from the remote control signal light receiving section 62 and corresponds to the user's instruction input, a control signal to be used for controlling the selector 25 and thereby switching the output video signal, and supplies the generated control signal to the selector 25.

As a result, a video signal that is supplied via the terminal that is selected in accordance with the user's instruction input is output from the selector 25 and supplied to the display circuit 26. The display circuit 26 forms, based on the received video signal, a signal to be supplied to the display device. The signal thus formed is supplied to the display device such as a cathode ray tube of the monitor receiver 2, whereby an image corresponding to the video signal that is supplied via the selected terminal is displayed on the display screen.

If the IEEE 1394 I/F circuit 21 of the monitor receiver 2 receives an identification start request by which the IRD 1 instructs the monitor receiver 2 (information input apparatus) to start processing of identifying an analog input terminal to which the analog output terminal of the IRD 1 is connected, the identification start request is communicated to the control section 50.

In the first embodiment, the identification start request is control information including a display message such as "Please switch to an analog input from the IRD." In response to the identification start request, the control section 50 of the monitor receiver 2 switches the selector 25 so that it outputs a video signal that is supplied via the digital input/output terminal.

The display message that is received being included in the identification start request is supplied to the display circuit 26 via the IEEE 1394 I/F circuit 21, the demultiplexer 22, the MPEG decoder 23, the D/A conversion section 24, and the selector 25, whereby the display message for urging the user to switch to an analog input from the IRD 1 is displayed on the display screen of the display device of the monitor receiver 2.

In response to the display message, the user manipulates the remote commander 65 and thereby makes switching sequentially to output signals of the selector 25. If switching is so made that a video signal that is supplied from the analog output terminal of the IRD 1 is output, as described above the identification display message is superimposed on the video signal.

As described above, for example, the identification display message is "This image is being output from the IRD. . . . " The display of such an identification display message makes it possible to identify the currently selected analog input terminal as the one connected to the analog output terminal of the IRD 1.

In this case, as described above, the identification display message that urges the user to push the decision button switch of the IRD 1 is displayed as information for identification. If the user pushes the decision button switch of the IRD 1, the IRD 1 sends an input terminal identification information supply request.

When the monitor receiver 2 receives the input terminal identification information supply request, the monitor receiver 2 can recognize that its own analog input terminal to which the analog output terminal of the IRD 1 is connected has been identified. The control section 50 of the monitor receiver 2 reads terminal information corresponding to the currently selected input terminal from its own ROM 52 and employs it as input terminal identification information. The control section 50 of the monitor receiver 2 correlates the input terminal identification information indicating the identified input terminal with the node ID of the IRD 1 and records resulting information in the connection management memory 61 as connection management information. In this case, the node ID of the IRD 1 is included in header portions of packeted information that is sent from the IRD 1 via the digital bus.

The monitor receiver 2 supplies the input terminal identification information of the identified input terminal to the IRD 1 by sending it to the digital bus via the IEEE 1394 I/F circuit 21. The IRD 1 receives the input terminal identification information from the monitor receiver 2, and as described above the control section 30 of the IRD 1 correlates the received input terminal identification information with the output terminal information of the self apparatus and the node ID of the monitor receiver 2 and records resulting information in the connection management memory 41 of the IRD 1.

As a result, the IRD 1 can make management as to which input terminal of the monitor receiver 2 its own analog output terminal is connected to. The monitor receiver 2 can make management as to which of its own analog input terminals is connected to what information output apparatus.

In the first embodiment, a user can make selection and switching as to whether the IRD 1 should output an analog video signal from the analog output terminal 1*ot*1 or 1*ot*2 or should output a digital video signal or the like from the digital input/output terminal 1*io*.

IF a user has instructed the IRD 1 to output an analog video signal from the analog output terminal 1*it*1 or 1*ot*2 by manipulating the remote commander 45 of the IRD 1, the control section 30 of the IRD 1 generates a selection control signal to be used for controlling the monitor receiver 2 so that it will select the analog input terminal that is connected to the analog output terminal of the IRD 1 and supplies the generated selection control signal to the monitor receiver 2 by sending it to the digital bus via the IEEE 1394 I/F circuit 19.

The IEEE 1394 I/F circuit 21 of the monitor receiver 2 receives the selection control signal supplied from the IRD 1. When notified about the selection control signal, the control section 50 controls the selector 25 so that an analog signal that is supplied via the specified analog input terminal is output.

As a result, controlled by the IRD 1 that is so set as to output an analog vide signal, the monitor receiver 2 can display, without any manipulation by the user, an image corresponding to an analog video signal supplied via the analog input terminal that is supplied with the analog video signal from the IRD 1.

As described above, for example, immediately after a user has connected the information output apparatus and the information input apparatus in both of analog form and digital form, processing of identifying an analog connection relationship between the electronic apparatuses is performed. And the identified analog connection relationship is managed. This makes it possible to select, reliably and correctly, a proper analog input terminal of the information input apparatus without requiring any manipulation by the user even if switching is made alternately between an analog output and a digital output in the information output apparatus that uses both of an analog output and a digital output.

Figure 7A:
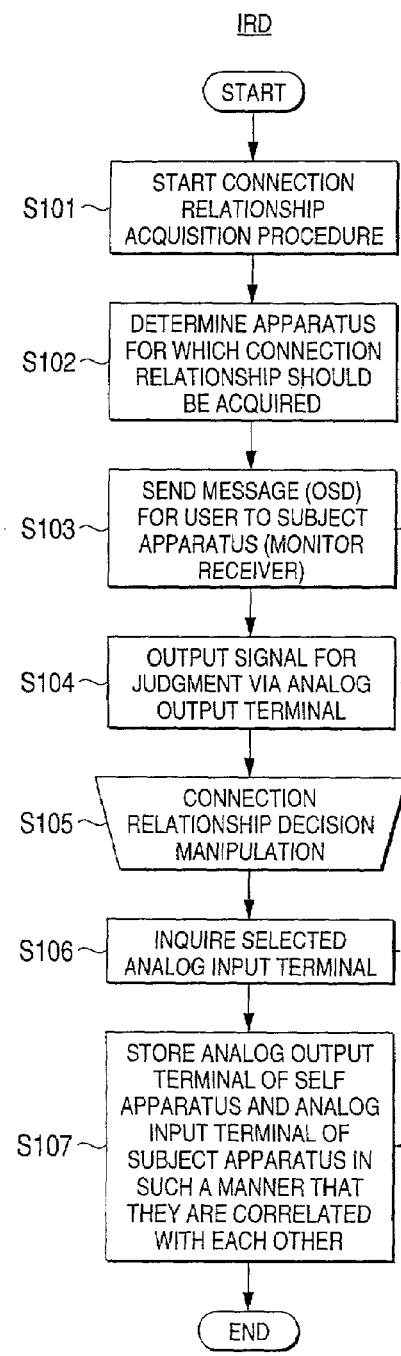
FIGS. 7A and 7B show a process for identifying and managing an input terminal of the monitor receiver connected to the output terminal of the IRD that is executed through cooperation between the IRD shown in FIG. 2 and the monitor receiver shown in FIG. 3.

Next, the process for identifying and managing an analog input terminal of the monitor receiver 2 connected to the analog output terminal of the IRD 1 that is executed through cooperation between the IRD 1 and the monitor receiver 2 in the home network system according to the first embodiment will be described with reference to a flowchart of FIGS. 7A and 7B.

As described above, the identification of an analog input terminal of the monitor receiver 2 connected to the analog output terminal of the IRD 1 is performed through cooperation between the IRD 1 and the monitor receiver 2. Therefore, a process of the IRD 1 (FIG. 7A) and a process of the monitor receiver 2 (FIG. 7B) will be described together.

In the first embodiment, a user makes, through the remote commander 45 of the IRD 1, an instruction input that commands execution of processing of identifying an analog input terminal of the monitor receiver 2 to which the output terminal of the IRD 1 is connected. When detecting such an instruction input, the control section 30 of the IRD 1 starts the process shown in FIG. 7A (step S101).

Then, the control section 30 of the IRD 1 controls the IEEE 1394 I/F circuit 19 and thereby searches for an electronic apparatus such as a monitor receiver that functions as an information input apparatus among the electronic apparatuses connected to the same digital bus (step S102).

For details of step S102, among the electronic apparatuses connected to the same digital bus an electronic apparatus (node) including a monitor sub-unit is searched for by using the asynchronous transaction that is prescribed by ISO (International Standardization Organization)/IEC (International Electrotechnical Commission)-13213, IEEE-1394-1995, IEC-61883-1, which is one of the standards of the IEEE 1394 digital interface.

An electronic apparatus detected by the search is employed as a subject electronic apparatus (information input apparatus) whose analog input terminal connected to the output terminal of the IRD 1 should be identified. In this embodiment, the monitor receiver 2 is made a subject.

As described above, the control section 30 of the IRD 1 generates an identification start request that is control information that includes a display message "Please switch to an analog input from the IRD" and that urges the user to start processing of identifying an analog input terminal of the information input apparatus connected to the output terminal of the IRD 1, and sends it to the digital bus via the IEEE 1394 I/F circuit 19 and the digital input/output terminal 1io (step S103).

In this case, the display message can be displayed according to a scheme that is standardized in EIA (Electronic Industries Association (U.S.))-775, which is one of the standards of the IEEE 1394 digital interface. Alternatively, the display message may newly be defined as a monitor sub-unit command that is prescribed as an AV/C command in the IEEE 1394 digital interface or transmitted according to a standardized scheme.

Then, the control section 30 of the IRD 1 controls the identification message generation section 15 and thereby makes it generate an identification display message as information for identification, makes the superimposition section 14 superimpose the generated identification display message on an analog video signal to be output from the analog output terminal, and causes a resulting signal to be output from the output terminal 1ot1 or 1ot2 (step S104).

Figure 7B:
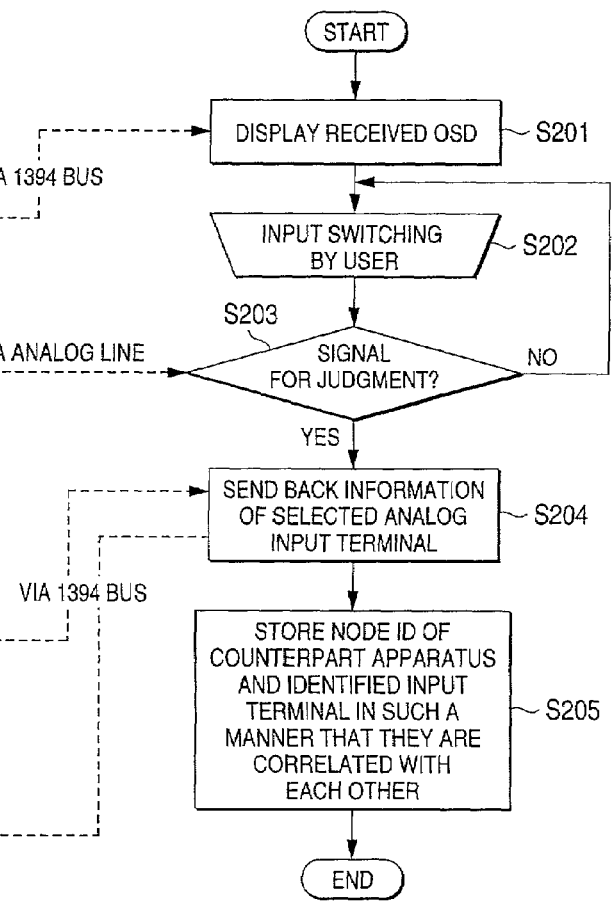

On the other hand, when the monitor receiver 2 receives the identification start request that was sent to the digital bus as a result of execution of step S103 in the IRD 1, the control section 50 executes the process shown in FIG. 7B. Specifically, when receiving the identification start request from the IRD 1 via the digital input/output terminal 2io1 and the IEEE 1394 I/F circuit 21, the control section 50 of the monitor receiver 2 switches the selector 25 so that a video signal that is received via the IEEE 1394 I/F circuit 21 is output. As a result, the display message included in the identification start request is displayed on the display screen of the display device of the monitor receiver 2; that is, a message that requests the user to perform a manipulation for switching among the analog input terminals 2in1 and 2in2 is displayed (step S201).

As for the message display at step S201, the reception of and the display control on the display message is performed according to a scheme that complies with the scheme standardized in EIA-775, for example. Alternatively, the display message may newly be defined as a monitor sub-unit command that is prescribed as an AV/C command in the IEEE 1394 digital interface or transmitted according to a standardized scheme.

Then, the monitor receiver 2 accepts a switching request for the selector 25 that is input by the user through the remote commander 65 of the monitor receiver 2, for example. In response to the switching request, the monitor receiver 2 switches the analog input terminal that accepts a video signal to be displayed on the display device of the monitor receiver 2 (step S202).

For example, in the monitor receiver 2 according to the first embodiment, step S202 is executed in such a manner that switching is made by what is called a toggle operation in order of video-1→video-2→ . . . in the same manner as in conventional analog TV receivers. Naturally, an alternative method is possible in which a GUI (graphic user interface) is provided in the monitor receiver 2 and selection of an arbitrary analog input terminal is enabled in the same manner as in the case of using a menu picture.

If the analog input terminal of the monitor receiver 2 connected to the analog output terminal of the IRD 1 has been selected, the identification display message is superimposed on an analog video signal (see step S104) whose input is accepted via the above analog input terminal and hence the identification display message is displayed on the display device of the monitor receiver 2.

Then, the user performs a manipulation of switching the selector 25 of the monitor receiver 2 while recognizing the display on the display device of the monitor receiver 2 (step S203). The user stops the manipulation of switching the selector 25 of the monitor receiver 2 when the identification display message has been displayed.

As described above, the identification display message not only indicates that an analog input terminal that accepts supply of a signal that is output from the IRD 1 has been identified but also urges the user to push the decision button switch of the IRD 1.

Therefore, the user performs a manipulation of pushing the decision button switch that is provided on the remote commander 45 of the IRD 1 in response to the identification display message displayed on the display device of the monitor receiver 2 (step S105). Naturally, an alternative method is possible in which the IRD 1 itself displays a menu picture on its own LCD, for example, and the user performs a manipulation of selecting a particular menu or icon being displayed therein. Then, the control section 30 of the IRD 1 inquires the identified analog input terminal via the IEEE 1394 I/F circuit 19 and the digital input/output terminal 1io (step S106).

Step S106 is a step of sending, to the digital bus, via the IEEE 1394 I/F circuit 19 and the digital input/output terminal 1io, a request that requests the monitor receiver 2 to supply input terminal identification information that is information indicating the identified analog input terminal.

When the monitor receiver 2 receives, via the digital input/output terminal 2io1 and the IEEE 1394 I/F circuit 21, the input terminal identification information supply request that was sent to the digital bus as a result of the execution of step S106, the control section 50 of the monitor receiver 2 sends, to the digital bus, via the IEEE 1394 I/F circuit 21, input terminal identification information indicating the currently selected analog input terminal that was identified as an analog input terminal for accepting supply of an analog video signal from the IRD 1 (step S204).

Then, in the monitor receiver 2, the control section 50 stores, in the connection management memory 61 of the monitor receiver 2, connection management information in which the node ID of the IRD 1 that was included in the control information received at step S201 is correlated with the input terminal information indicating the identified analog input terminal (step S205). The analog input terminal identification process of the monitor terminal 2 is finished when the execution of step S205 has completed.

On the other hand, when the IRD 1 receives the input terminal identification information that is sent to the digital bus via the IEEE 1394 I/F circuit 21 of the monitor receiver 2, the control section 30 stores, in the connection management memory 41 of the IRD 1, output terminal information indicating the output terminal of the self apparatus that is outputting an analog video signal, the received input terminal identification information, and the node ID of the monitor receiver 2 in such a manner that they are correlated with each other (step S107). The analog input terminal identification process of the IRD 1 is finished when the execution of step S107 has completed.

In the above process, connection management information is generated and recorded in the connection management memory 61 of the monitor receiver 2 after the monitor receiver 2 has received an input terminal identification information supply request from the IRD 1 and has sent input terminal identification information in response to the request. However, also in the monitor receiver 2, connection management information may be recorded being triggered by a user's instruction input.

This will be described below. When the monitor receiver 2 receives, from the IRD 1, an analog video signal on which an identification display message is superimposed, the identification display message is displayed on the display screen of the display device of the monitor receiver 2. When the user has recognized it visually, he pushes the decision button switch that is provided on the remote commander 65 of the monitor receiver 2.

When the decision button switch provided for the monitor receiver 2 is pushed, the control section 50 of the monitor receiver 2 judges that an analog input terminal for accepting input of an analog video signal from the IRD 1 has been identified. Then, in the monitor receiver 2, input terminal identification information indicating the identified analog input terminal, the node ID of the IRD 1, etc. are stored in its own connection management memory 61 in such a manner as to be correlated with each other.

In this case, the monitor receiver 2 can voluntarily supply the input terminal identification information, the node ID of the monitor receiver 2, etc. to the IRD 1 via the IEEE 1394 I/F circuit 21 and the digital bus. Therefore, in this case, it is not necessary for the IRD 1 to send an input terminal identification information supply request.

A process that dispense with pushing of the decision button switch provided for the monitor receiver 2 is possible. Specifically, a menu is displayed on the display device of the monitor receiver 2. When an item for signifying decision of an input terminal is selected from the menu, the control section 50 of the monitor receiver 2 judges that an analog input terminal for accepting input of an analog video signal from the IRD 1 has been identified.

As described above, in this embodiment, both of the IRD 1 and the monitor receiver 2 can manage analog connection relationships. Therefore, if the IRD 1 is configured in such a manner that when a prescribed key of the remote commander 45 of the IRD 1 is manipulated the information stored in the connection management memory 41 of the IRD 1 is displayed on the display device such as an LCD of the IRD 1, a user can recognize which analog input terminal of the monitor receiver 2 the analog output terminal of the IRD 1 is connected to. Therefore, analog input terminal switching of the monitor receiver 2 can be performed correctly.

Naturally, by providing a similar inquiring function in the monitor receiver 2, analog input terminal switching of the monitor receiver 2 can be performed correctly so that a user can recognize an analog input terminal of the self apparatus to which the analog output terminal of a target information output apparatus is connected and an analog video signal can be supplied from the target information output apparatus.

[Analog Input Terminal Automatic Switching Control of Information Input Apparatus]

[Case of Using Information in Connection Management Information of IRD]

As described above, the connection management memory 41 of the IRD 1 holds connection management information consisting of output terminal information of the self apparatus, input terminal identification information indicating an analog input terminal of the monitor receiver 2 that is connected to an analog output terminal that is indicated by the output terminal information, and the node ID of the monitor receiver 2. Therefore, by using the connection management information, the IRD 1 can perform control so as to select the above analog input terminal of the monitor receiver 2.

Specifically, in this embodiment, when a user has made an instruction input that instructs the IRD 1 to output an analog video signal from an analog output terminal, the control section 30 of the IRD 1 generates a selection control signal including the input terminal identification information indicating the analog input terminal of the monitor receiver 2 that is connected to the analog output terminal of the self apparatus based on the connection management information stored in the connection management memory 41 of the self apparatus. Then, the control section 30 of the IRD 1 supplies the generated selection control signal to the monitor receiver 2 by sending it to the digital bus via the IEEE 1394 I/F circuit 19 and the digital input/output terminal 1*io*.

When the monitor receiver 2 receives the selection control signal from the IRD 1, the control section 50 performs switching so that the output signal of the selector 25 becomes a signal coming from the analog input terminal indicated by the input terminal identification information included in the selection control signal that is received via the digital input/output terminal 2*io*1 and the IEEE 1394 I/F circuit 21. In this manner, automatic switching (automatic selection) among the analog input terminals of the monitor receiver 2 can be performed without the user's manipulating the remote commander 65 of the monitor receiver 2.

Therefore, where output is made from an analog output terminal of the IRD 1 in response to a user's instruction, an input terminal of the monitor receiver 2 connected to the analog output terminal can be selected automatically. Therefore, no time and labor are needed for analog input terminal switching.

[Case (1) of Using Information of Connection Management Memory of Monitor Receiver]

In the first embodiment, the monitor receiver 2 is also provided with the connection management memory 61 and manages an analog connection relationship between the self apparatus and the IRD 1 that supplies an analog signal to the self apparatus. In view of this, for example, when the IRD 1 is to output an analog signal from its own analog output terminal, first the IRD 1 sends a connection management information supply request to the monitor receiver 2 via its own IEEE 1394 I/F circuit 19 and digital input/output terminal 1*io* and the digital bus.

In response to the supply request, the monitor receiver 2 sends all the connection management information stored in its own connection management memory 61 to the IRD 1 via its own IEEE 1394 I/F circuit 21 and the digital bus. The IRD 1 receives the connection management information from the monitor receiver 2 via the digital input/output terminal 1io and the IEEE 1394 I/F circuit 19 and extracts input terminal identification information indicating an input terminal connected to its own output terminal from the received connection management information.

Then, the IRD 1 generates a selection control signal including the extracted input terminal identification information and supplies it to the monitor receiver 2 by sending it to the digital bus via its own IEEE 1394 I/F circuit 19 and digital input/output terminal 1io. The input terminal of the monitor receiver 2 for receiving an analog signal from the URD 1 can be selected automatically by the monitor receiver 2's switching its own selector 25 in accordance with the selection control signal supplied from the IRD 1.

Naturally, it not always necessary to supply the IRD 1 with all the connection management information stored in the connection management memory 61 of the monitor receiver 2; only connection management information relating to the IRD 1 mat be sent back to the IRD 1. In this case, the IRD 1 need not perform processing of extracting connection management information relating to the IRD 1 from the connection management information supplied from the monitor receiver 2.

[Case (2) of Using Information of Connection Management Memory of Monitor Receiver]

Connection management information stored in the connection management memory 61 of the monitor receiver 2 includes the node ID an information output apparatus. In view of this, when the IRD 1 is to output an analog signal from its own analog output terminal, first the IRD 1 supplies a selection control signal including the node ID of the self apparatus to the monitor receiver 2 by sending it to the digital bus via its own IEEE I/F circuit 19 and digital input/output terminal 1io.

The monitor receiver 2 receives the selection control signal from the IRD 1 and extracts connection management information relating to the IRD 1 stored in its own connection management memory 61 based on the node ID of the IRD 1 included in the selection control signal. An input terminal of the monitor receiver 2 for receiving an analog signal from the IRD 1 can be selected automatically by switching its own selector 25 based on the input terminal identification information included in the connection management information.

As described above, the monitor receiver 2 can reliably select and utilize an analog signal sent from the IRD 1 by automatically switching the selector 25 of the monitor receiver 2 based on the connection management information stored in the connection management memory 41 of the IRD 1 or the connection management information stored in the connection management memory 61 of the monitor receiver 2.

[Timing of Starting Analog Input Terminal Identification Processing]

[(1) Case in which Processing is Performed in Accordance with Presence/Absence of Data in Connection Management Memory of IRD]

In the first embodiment, processing of identifying an analog input terminal of the monitor receiver 2 to which the output terminal of the IRD 1 is connected is started when the prescribed manipulation key of the remote commander 45 of the IRD 1 has been manipulated. However, the invention is not limited to such a case.

For example, when the power is applied to the IRD 1, the control section 30 checks whether connection management information is stored in the connection management memory 41 of the self apparatus. If connection management information is not stored, the control section 30 sends an identification start request to the digital bus by controlling the IEEE 1394 I/F circuit 19 and sends an identification display message from an analog output terminal by controlling the identification message generation section 15.

This makes it possible to start processing of identifying an analog connection relationship between the IRD 1 and an information input apparatus in a case where connection management information is not stored in the connection management memory 41 of the IRD 1.

[(2) Case in which Processing is Performed in Accordance with Presence/Absence of Data in Connection Management Memory of Monitor Receiver]

When the power is applied to the monitor receiver 2 as an information input apparatus, the control section 50 checks whether connection management information is stored in its own connection management memory 61. If connection management information is not stored, the control section 50 controls the IEEE 1394 I/F circuit 21 and thereby sends the digital bus a sending request that requests an information output apparatus such as the IRD 1 to send an identification start request.

Processing of identifying an input terminal of the monitor receiver 2 connected to the output terminal of the IRD 1 can be started in such a manner that the IRD 1 that has received the sending request sends an identification start request (digital signal) and an identification display message (analog signal) in the above-described manner.

This makes it possible to start processing of identifying an analog connection relationship through cooperation with an information output apparatus connected to the monitor receiver 2 in a case where connection management information is not stored in the connection management memory 61 of the monitor receiver 2.

[(3) Case in which Processing is Performed by Detecting Alteration in Analog Connections of Monitor Receiver]

Insertion or removal of a connector into or from the analog input terminals 2in1, 2in2, and 2in3 of the monitor receiver 2 is detected. When alteration in the analog connections of the monitor receiver 2 has been detected, the control section 50 of the monitor receiver 2 controls the IEEE 1394 I/F circuit 21 and thereby sends, to the digital bus, a sending request that requests an information output apparatus such as the IRD 1 to send an identification start request.

As in the same manner as in case (2) in which "processing is performed in accordance of presence/absence of data in connection management memory of monitor receiver," processing of identifying an input terminal of the monitor receiver 2 connected to the output terminal of the IRD 1 can be started in such a manner that the IRD 1 that has received the sending request from the monitor receiver 2 sends an identification start request (digital signal) and an identification display message (analog signal).

FIG. 8 is a block diagram of an exemplary monitor receiver capable of detecting alteration in the analog connections. The monitor receiver shown in FIG. 8 is configured in the same manner as the monitor receiver 2 shown in FIG. 3 except that the former is provided with a connection detection section 90. Therefore, the components of the monitor receiver shown in FIG. 8 that are configured in the same manner as the corresponding components in the monitor apparatus 2 shown in FIG. 3 are given the same reference symbols as the latter and will not be described.

The connection detection section 90 of the monitor receiver shown in FIG. 8 detects insertion or removal of a connector into or from the analog input terminals of the monitor receiver based on their electrical characteristics. When detecting insertion or removal, the connection detection section 90 notifies the control section 50 of the monitor receiver about it.

The connection detection section 90 of the monitor receiver of this example detects insertion or removal of a connector into or from the analog input terminals 2in1, 2in2, and 2in3 of the monitor receiver by monitoring electrical characteristics such as the levels of signals supplied from the analog input terminals 2in1, 2in2, and 2in3, impedance values, or the like.

By identifying an analog connection relationship with an input output apparatus such as the IRD 1 in the above-described manner when insertion or removal of a connector into or from the analog input terminals of the monitor receiver, a latest analog connection relationship can be identified and managed when alteration has occurred in the analog connections.

All of the above methods may be used. That is, the processing of identifying an analog input terminal is performed when one of the above cases (1)–(3) and an instruction input by a user has occurred. This prevents occurrence of a state that no analog connection relationship is managed. The above-described processing of identifying an analog input terminal may be performed necessarily when the power is applied to an electronic apparatus connected to the home network system including the IRD 1 and the monitor receiver 2.

[Information Necessary Between Information Output Apparatus and Information Input Apparatus]

In the first embodiment, connection management information to be stored in the connection management memory 41 of the IRD 1 as an information output apparatus is output terminal information of the self apparatus, input terminal identification information, and the node ID of an information input apparatus. Connection management information to be stored in the connection management memory 61 of the monitor receiver 2 as an information input apparatus is input terminal identification information and the node ID of a counterpart information output apparatus.

However, the specific information of an electronic apparatus for identifying an information output apparatus or an information input apparatus is not limited to the node ID. For example, the physical ID may be used instead of the node ID.

In view of a possibility that resetting of the connection environment (what is called bus resetting) is caused by attachment or detachment of an electronic apparatus in the connections of the digital bus, the node unique ID or the SDD (self describing devices) information may be used in addition to the node ID or the physical ID. The use of the node unique ID or the SDD information makes it possible to easily reconstruct information of a new connection relationship after occurrence of bus resetting through comparison with information of a previous connection relationship before the bus resetting.

The serial No. of an information output apparatus or an information input apparatus may be included in connection management information. The use of the serial No. makes it possible to distinguish a plurality of apparatuses of the same type that are connected to the same digital bus.

As described above, the following four kinds of information are needed to identify and manage in a more detailed manner an analog connection relationship between an information output apparatus and an information input apparatus:

(1) The node ID or the physical ID of the counterpart apparatus.

(2) Terminal information held by each apparatus (input terminal identification information indicating an input terminal that has been identified in the information input apparatus or output terminal information to identify an analog output terminal in the information output apparatus).

(3) The node unique ID or the SDD information of the counterpart apparatus.

(4) The serial No. of the counterpart apparatus.

The above kinds of information are prescribed by a standard document, operation rules, or the like of a standard such as ISO/IEC 13212 (ANSI/IEEE Std. 1212; mentioned above). Each electronic apparatus connected to the digital bus can acquire such information according to a procedure using commands and responses that are prescribed by such a document.

Naturally, information other than the above information may also be used. For example, various kinds of necessary information such as a date when processing of identifying an analog connection relationship is performed may be included in connection management information to be stored in the connection management memory.

The first embodiment has been described above for the example in which an analog connection relationship between the IRD 1 (information output apparatus) and the monitor apparatus 2 (information input apparatus) is identified and managed. However, it is possible to identify and manage an analog connection relationship between the DVTR 3 and the monitor apparatus 2 in the same manner as between the IRD 1 and the monitor apparatus 2.

This will be explained below. Like the IRD 1, the DVTR 3 of the first embodiment is not only provided with a superimposition section and an identification message generation section upstream of the analog output terminal 3ot but also provided with an IEEE 1394 I/F circuit and a connection management memory, and can identify and manage an analog connection relationship through cooperation with the monitoring apparatus 2.

Therefore, the monitor receiver 2 as an information input apparatus can identify and manage analog connection relationships with all information output apparatuses that are connected to the self apparatus in both analog form and digital form. Further, each information output apparatus can manage at least an analog connection relationship between the self apparatus and a target information input apparatus.

However, each information output apparatus can also manage analog connection relationships between information output apparatuses other than the self apparatus and information input apparatuses that are connected to the same digital bus by receiving connection management information from those other information output apparatuses and the information input apparatuses via the digital bus.

Embodiment 2

In the above-described first embodiment, an analog input terminal being supplied with an analog signal on which information for identification is superimposed by sending the information for identification as a display message from an analog output terminal of the IRD 1 as an information output apparatus and a user's manually switching among the input terminals of the monitor receiver 2.

The second embodiment is intended to eliminate a user's manipulations on the monitor receiver in a process for identifying an analog input terminal and to identify an analog input terminal of the monitor receiver automatically. As in the case of the first embodiment that has been described above with reference to FIGS. 4-6, the second embodiment will also be described for an example in which a home network is formed by an IRD (information output apparatus), a monitor receiver (information input apparatus), and a VDTR (information output apparatus) and an analog connection relationship between the IRD and the monitor receiver is identified and managed.

In the second embodiment, an IRD 7 (described below) corresponds to the IRD 1 of the first embodiment shown in FIGS. 4 and 5 and a monitor receiver 8 corresponds to the monitor receiver 2 of the first embodiment shown in FIGS. 4 and 5.

[IRD]

Figure 9:
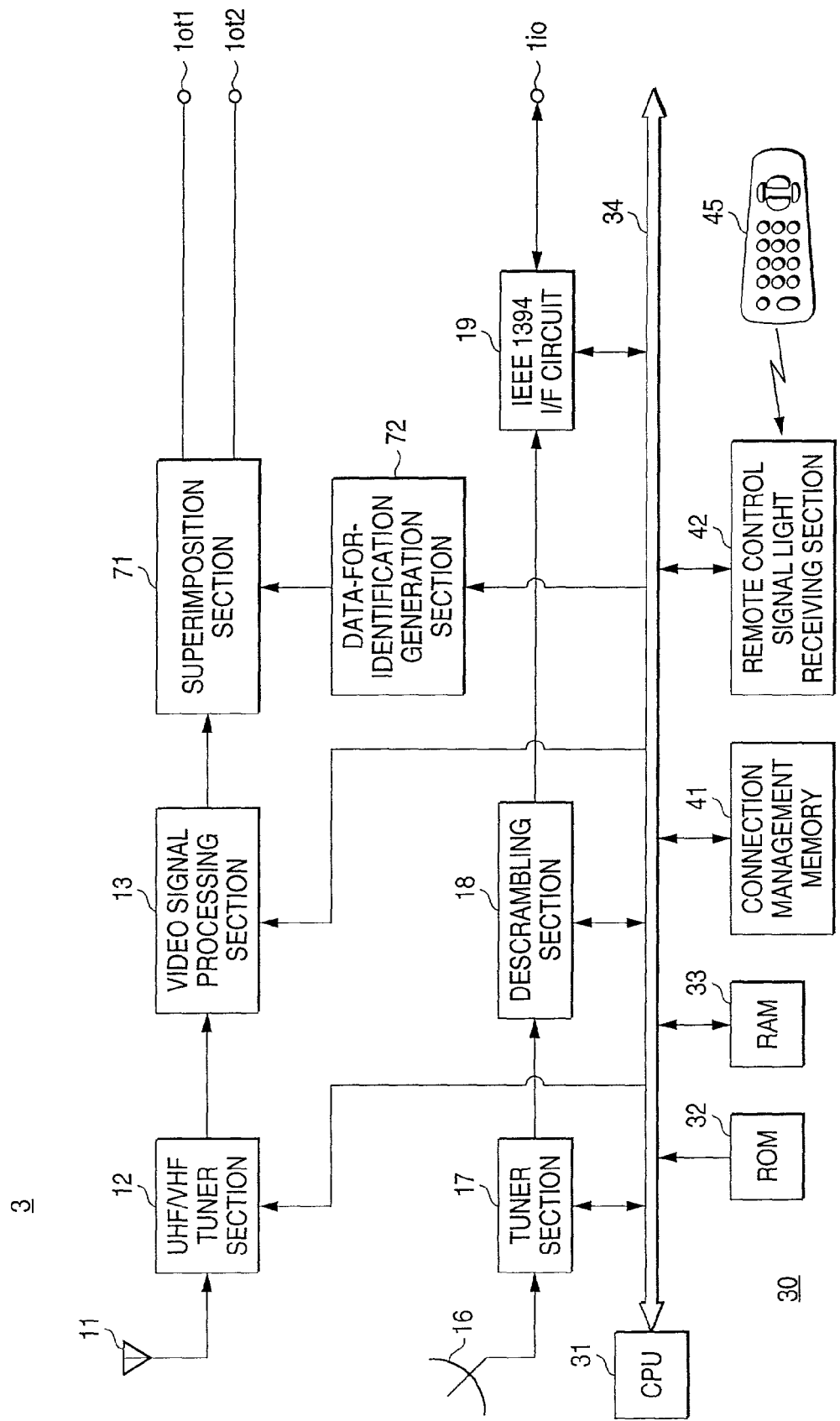
FIG. 9 is a block diagram of another exemplary IRD as the information output apparatus according to the invention.

FIG. 9 is a block diagram of the IRD 7 according to the second embodiment. In the IRD 7 according to the second embodiment, the individual sections other than a data-for-identification superimposition section 71 and a data-for-identification generation section 72 are configured approximately in the same manner as the corresponding sections in the IRD 1 of the first embodiment shown in FIG. 2. Therefore, the sections other than the data-for-identification superimposition section 71 and the data-for-identification generation section 72 of the IRD 7 according to the second embodiment shown in FIG. 9 are given the same reference numerals as the corresponding sections of the IRD 1 shown in FIG. 2 and will not be described.

Also in the second embodiment, when instructed to perform processing of identifying an analog input terminal of the information input apparatus connected to the analog output terminal of the IRD 7 by, for example, a manipulation on a prescribed manipulation key on the remote commander 45 of the IRD 7, the control section 30 of the ITD 7 sends an identification start request to the digital bus via the IEEE 1394 I/F circuit 19 and the digital input/output terminal 1*io*.

At this time, the control section 30 of the IRD 7 controls the data-for-identification generation section 72 to make it generate data for identification (information for identification) that can be detected in the monitor receiver 8. The data-for-identification generation section 72 of the IRD 7 according to the second embodiment generates, rather than information for identification as a display message, data for identification that can correctly be detected inside the information input apparatus that is supplied with the data for identification without being recognized by a user.

The data-for-identification generation section 72 generates, for example, prescribed data for identification having strong autocorrelation and supplies it to the data-for-identification superimposition section 71. The data-for-identification superimposition section 71 superimposes the data for identification supplied from the data-for-identification generation section 72 on a video signal supplied from the video signal processing section 13 and sends a resulting signal via an analog output terminal.

The data for identification may be superimposed on a video signal in the effective pixel region or in a region outside the effective pixel region such as the vertical blanking interval (VBI). For example, where the data for identification is data such as digital watermark information that does not deteriorate an image to be obtained by reproducing an associated video signal, the data for identification is superimposed in the effective pixel region. Conversely, where the data for identification has such a high level as to deteriorate an image to be obtained by reproducing a video signal, it is superimposed in a region outside the effective pixel region.

As described above, the IRD 7 according to the second embodiment sends, via an analog output terminal, an analog video signal on which data for identification is superimposed that cannot be recognized by a user but can be detected in an information input apparatus as a destination of the analog video signal.

Examples of the data for identification are various kinds of digital watermark information such as a PN (pseudo noise (pseudo-random noise)) code and a spread spectrum signal obtained by spectrum-spreading prescribed information by using a PN code. Where such a spread spectrum signal is used, the monitor receiver 8 (described later) can detect a spread spectrum signal by performing inverse spectrum spreading.

An example of data for identification that is superimposed in the vertical blanking interval is such that predetermined information such as information indicating the type of electronic apparatus is superimposed in predetermined horizontal periods of the vertical blanking interval.

[Monitor Receiver]

Figure 10:
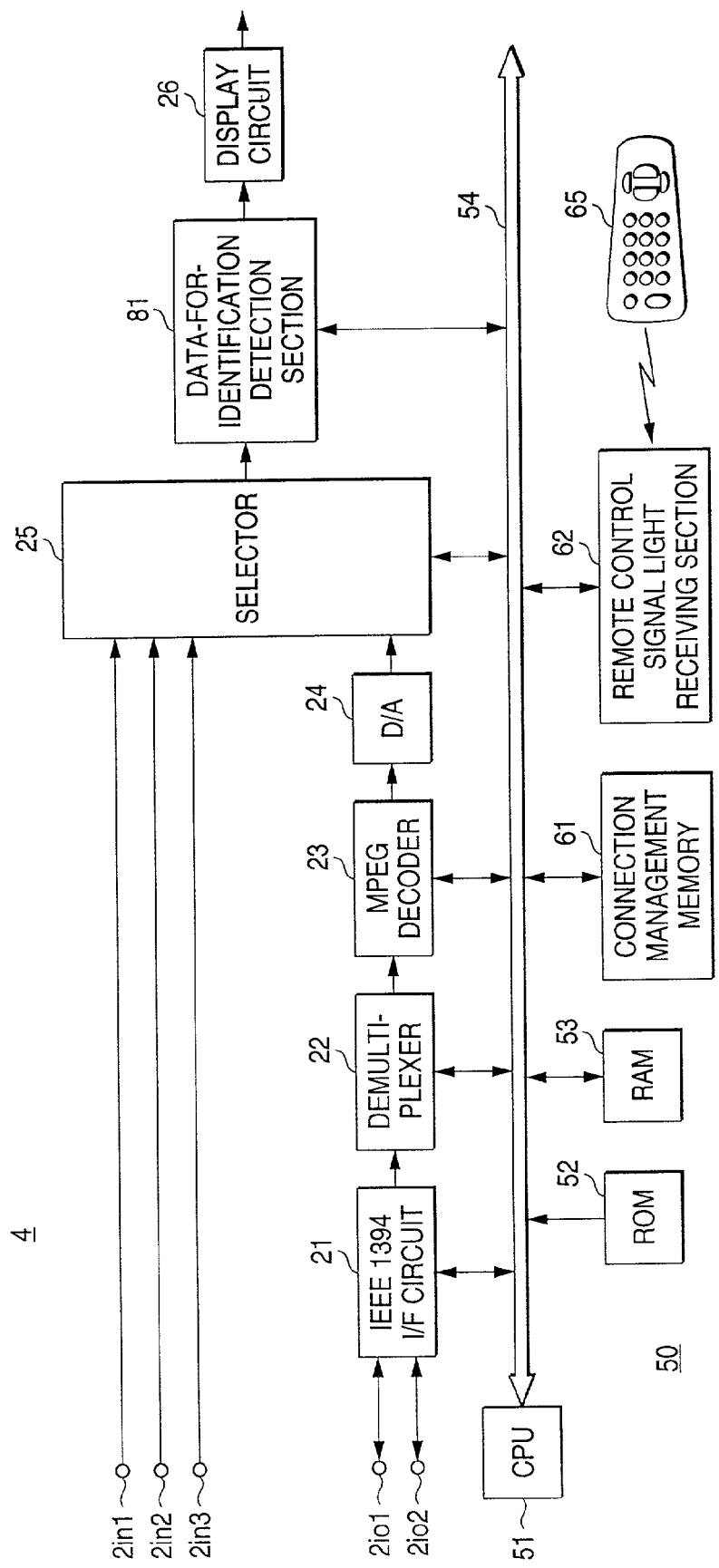
FIG. 10 is a block diagram of a further exemplary monitor receiver as the information input apparatus according to the invention.

Next, the monitor receiver 8 according to the second embodiment will be described. FIG. 10 is a block diagram of the monitor receiver 8 according to the second embodiment. As shown in FIG. 10, in the monitor receiver 8 according to the second embodiment, a data-for-identification detection section 81 is provided downstream of the selector 25.

The individual sections other than the data-for-identification detection section 81 are configured in the same manner as the corresponding sections of the monitor receiver 2 according to the first embodiment that has been described above with reference to FIG. 3. Therefore, the sections of the monitor receiver 8 according to the second embodiment shown in FIG. 10 that are configured in the same manner as the corresponding sections of the monitor receiver 2 according to the first embodiment are given the same reference symbols as the latter and will not be described.

In the monitor apparatus 8 according to the second embodiment, the data-for-identification detection section 81 performs predetermined correlation detection processing. If a detection result is greater than a prescribed value, the data-for-identification detection section 81 judges that data for identification has been detected and notifies the control section 50 that data for identification has been detected. Therefore, when the data-for-identification detection section 81 has detected data for identification, the control section 50 can identify the analog input terminal being selected by the selector 25 as an analog input terminal connected to the analog output terminal of the IRD 7.

Therefore, when the monitor receiver 8 according to the second embodiment receives an identification start request from the IRD 7 with the IEEE 1394 I/F circuit 21, the control section 50 automatically switches the selector 25 in a sequential manner so that a video signal that is input via each of the three analog input terminals is supplied to the data-for-identification detection section 81 for a prescribed time.

As described above, when data for identification has been detected by the data-for-identification detection section 81, the control section 50 is notified about the detection of data for identification. The control section 50 stops the switching control on the selector 25. As in the case of the monitor receiver 2 according to the first embodiment, the control section 50 supplies input terminal identification information indicating the identified input terminal and specific information of the monitor receiver 8 to the IRD 7 via the digital bus, and generates connection management information including the input terminal information indicating the identified input terminal and specific information of the IRD 7 and stores it in the connection management memory 61.

As described above, in the home network system according to the second embodiment, an analog input terminal of the monitor receiver 8 connected to the output terminal of the IRD 7 can be identified and managed automatically without requiring any manual manipulation except for input of an instruction to start processing of identifying an analog input terminal of the monitor receiver 8 that is connected to the analog output terminal of the IRD 7.

For example, where as described above a spread spectrum signal obtained by spectrum spreading using a predetermined PN code is superimposed on an analog signal supplied from the IRD 7, the data-for-identification 81 can detect data for identification by performing inverse spectrum spreading on a received analog video signal by using the same PN code as was used in the IRD 7.

Next, the process for identifying and managing an analog input terminal of the monitor receiver 8 connected to the analog output terminal of the IRD 7 that is executed in the home network system according to the second embodiment will be described with reference to a flowchart of FIGS. 11A and 11B.

In the second embodiment, as in the case of the above-described first embodiment, the identification of an analog input terminal of the monitor receiver 8 connected to the analog output terminal of the IRD 7 is performed through cooperation between the IRD 7 and the monitor receiver 8.

Therefore, a process of the IRD 7 (FIG. 1A) and a process of the monitor receiver 8 (FIG. 1B) will be described together.

Also in the second embodiment, the control section 30 of the IRD 7 starts the process shown in FIG. 11A when it detects input of a particular instruction to identify an analog input terminal of the monitor receiver 8 that a user makes through the remote commander 45 of the IRD 7 (step S301).

Then, the control section 30 of the IRD 7 controls the IEEE 1394 I/F circuit 19 and thereby searches for an electronic apparatus such as a monitor receiver that functions as an information input apparatus among the electronic apparatuses connected to the same digital bus (step S302).

For details of step S302, as in the case of the above-described first embodiment, among the electronic apparatuses connected to the same digital bus an electronic apparatus (node) including a monitor sub-unit is searched for by using asynchronous transaction according to the standard of the IEEE 1394 digital interface. An electronic apparatus detected by the search is employed as a subject electronic apparatus (information input apparatus) whose analog input terminal connected to the output terminal of the IRD 7 should be identified. In this embodiment, the monitor receiver 8 is made a subject.

Then, the control section 30 of the IRD 7 generates an identification start request that is control information that urges the user to start processing of identifying an analog input terminal of the monitor receiver 8 connected to the output terminal of the IRD 7 and sends it to the digital bus via the IEEE 1394 I/F circuit 19 (step S303).

Then, the control section 30 of the IRD 7 controls the data-for-identification generation section 72 and thereby makes it generate predetermined data for identification having strong autocorrelation, makes the data-for-identification superimposition section 71 superimpose the generated data for identification on an analog video signal to be output, and causes a resulting signal to be output from the analog output terminal 1*ot*1 or 1*ot*2 (step S304).

Figure 1B:
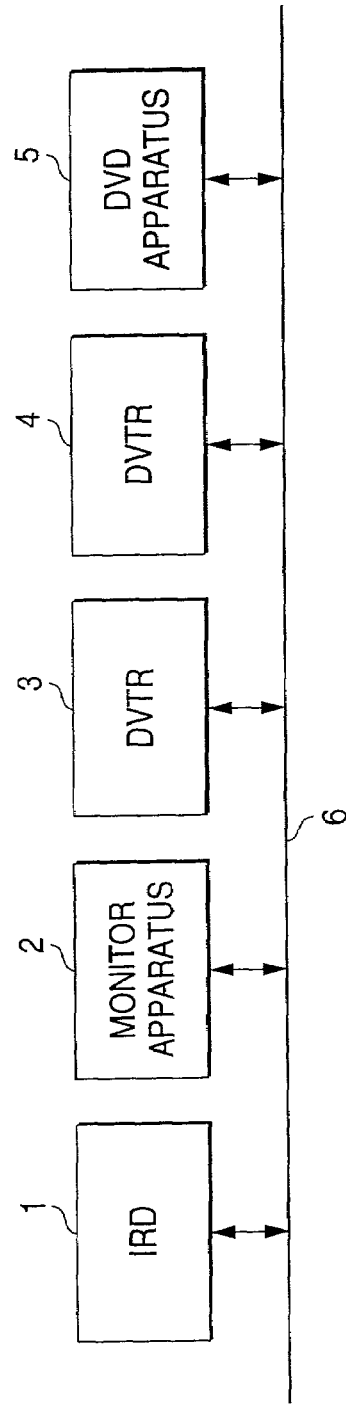

On the other hand, when the monitor receiver 2 receives the identification start request that was sent to the digital bus as a result of execution of step S303 in the IRD 7, the control section 50 executes the process shown in FIG. 1B. Specifically, when receiving the identification start request from the IRD 7 via the IEEE 1394 I/F circuit 21, the control section 50 of the monitor receiver 8 sends back, to the IRD 7, a response deferment response to the effect that response is deferred (step S401).

Then, the control section 50 controls the selector 25 so that it performs switching, sequentially and the data-for-identification detection section 81 monitors signals that are supplied from the respective analog input terminals (step S402). Monitoring a notice from the data-for-identification detection section 81, the control section 50 judges whether data for identification is superimposed on the signals coming from the analog input terminals that are being monitored (step S403). If it is judged at the judgment step S403 that no data for identification has been detected, steps S402 and S403 are executed again.

If it is judged at the judgment step S403 that data for identification has been detected, the control section 50 of the monitor receiver 8 sends back a response that was deferred. That is, the control section 50 sends back a response to the identification start request that was received at step S401 (step S404).

When the response is sent back, the IRD 7 can recognize that an analog input terminal of the monitor receiver 8 has been identified. Therefore, the control section 30 of the IRD 7 inquires the selected analog input terminal (step S305 in FIG. 11A). Step S305 is a step of sending a request that requests supply of input terminal identification information indicating the analog input terminal that has been identified in the monitor receiver 8.

When the monitor receiver 8 receives, via the IEEE 1394 I/F circuit 21, the input terminal identification information supply request that was sent to the digital bus as a result of the execution of step S305, the control section 50 of the monitor receiver 8 sends, to the digital bus, via the IEEE 1394 I/F circuit 21, input terminal identification information indicating the currently selected analog input terminal that was identified as an analog input terminal for accepting supply of an analog video signal from the IRD 7 (step S405).

Then, in the monitor receiver 8, the control section 50 stores, in the connection management memory 61 of the monitor receiver 8, connection management information in which the node ID of the IRD 7 that was included in the control information that was received via the IEEE 1394 I/F circuit 21 is correlated with the input terminal information indicating the identified analog input terminal (step S406). The analog input terminal identification process of the monitor terminal 8 is finished when the execution of step S406 has completed.

On the other hand, as shown in FIG. 11A as step S306, when the IRD 7 receives the input terminal identification information that is sent via the IEEE 1394 I/F circuit 21 of the monitor receiver 8, the control section 30 stores, in the connection management memory 41 of the IRD 7, output terminal information indicating the output terminal of the self apparatus that is outputting an analog video signal, the received input terminal identification information, and the node ID of the monitor receiver 8 in such a manner that they are correlated with each other. The analog input terminal identification process of the IRD 7 is finished when the execution of step S306 has completed.

As described above, in the second embodiment, an analog input terminal of the monitor receiver 8 connected to the analog output terminal of the IRD 7 can be identified automatically without a user's switching among the input terminals of the monitor receiver 8 one by one or manipulating the decision button switch or the like of the IRD 7 after determination of an analog input terminal in the monitor receiver 8. An analog connection relationship between the IRD 7 and the monitor receiver 8 can be managed in both of the IRD 7 and the monitor receiver 8.

Also in the second embodiment, an automatic switching control can be performed automatically in the same manner as in the first embodiment based on the information stored in the respective connection management memories 41 and 61 of the IRD 7 and the monitor receiver 8.

By providing the DVTR 3 with the superimposition section 71 and the data-for-identification section 72 of the IRD 7, an analog connection relationship between the DVTR 3 and the monitor receiver 8 can be identified and managed in the same manner as between the IRD 7 and the monitor receiver 8.

One possible modification is as follows. The IRD 7 sends, to the monitor receiver 8, as an argument of an identification start request, information that is necessary for the data-for-identification detection section 81 of the monitor receiver 8 to detect autocorrelation. The data-for-identification detection section 81 of the monitor receiver 8 detects data for identification superimposed on an analog video signal that is sent from the analog output terminal of the IRD 7 by using the information that has been supplied as the argument.

Another possible modification is as follows. Where data for identification is transmitted being superimposed on an analog video signal in the VBI, for example, specific information such as a node ID, for example, that is specific to an electronic apparatus and is included in an identification start request or the like to be transmitted via the IEEE 1394 I/F circuit 19 is used as the data for identification.

If the monitor receiver 8 finds coincidence between specific information specific to an electronic apparatus that is included in an identification start request received via the IEEE 1394 I/F circuit 21 and data for identification that is superimposed on an analog video signal, an analog input terminal that is selected by the selector 25 at that time is identified as an analog input terminal connected to the analog output terminal of the electronic apparatus that is indicated by the specific information.

In the second embodiment, the data-for-identification detection section 81 is disposed downstream of the selector 25. However, the invention is not limited to such a case. One data-for-identification detection section may be disposed between each of the analog input terminals 2in1, 2in2, and 2in3 of the monitor receiver 8 and the selector 25.

In this case, the control section 50 can immediately identify an analog input terminal of the self apparatus that is connected to the analog output terminal of the IRD 7 based on detection results that are supplied from the data-for-identification detection sections corresponding to the respective analog input terminals 2in1, 2in2, and 2in3. The control section 50 can switch the selector 25 so that it outputs a video signal supplied from the identified analog input terminal.

The above-described first and second embodiments are directed to the exemplary home network systems in which as shown in FIGS. 4 and 5 the IRD and the DVTR serve as information output apparatuses and the monitor receiver that accepts supply of an information signal etc. from the information output apparatus serves as an information input apparatus. However, the invention is not limited to such a case.

Figure 12:
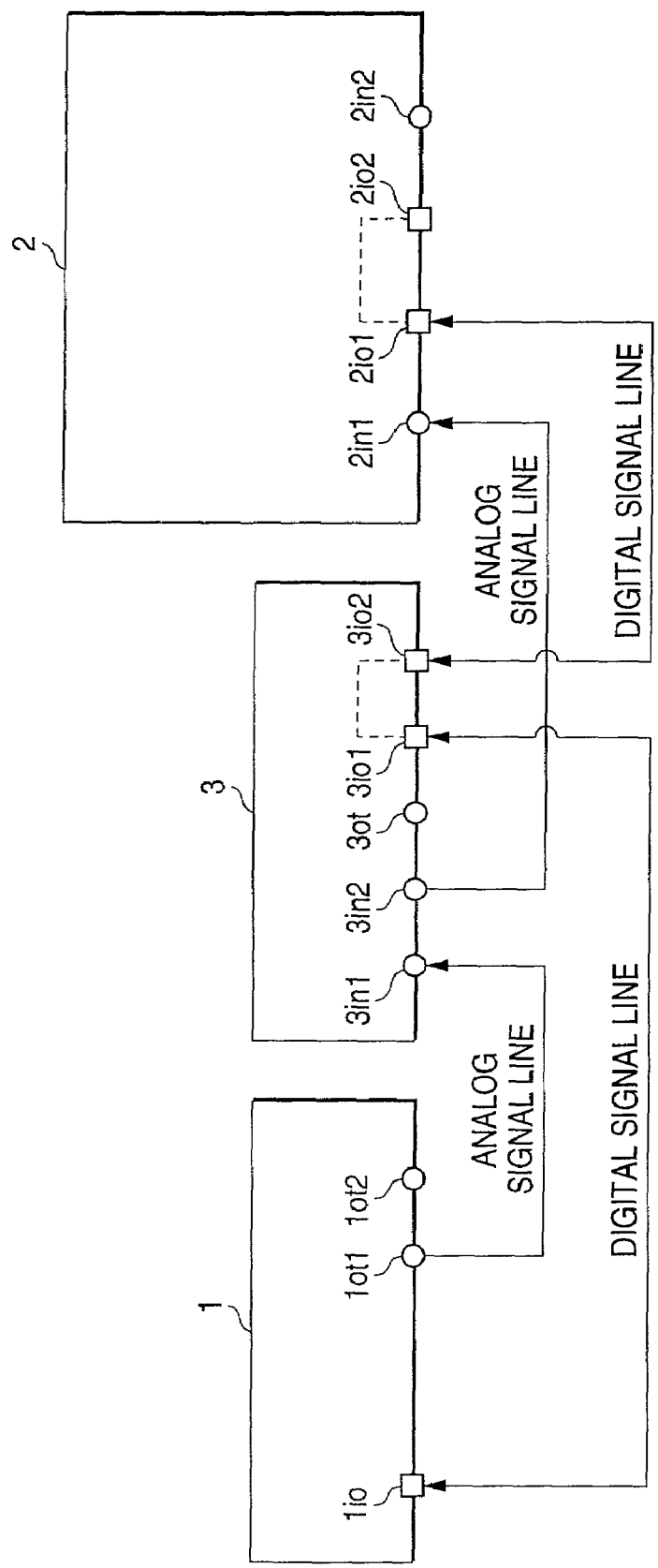
FIG. 12 shows another exemplary home network system according to the invention that is formed by the information output apparatus and the information input apparatus according to the invention.
Figure 13:
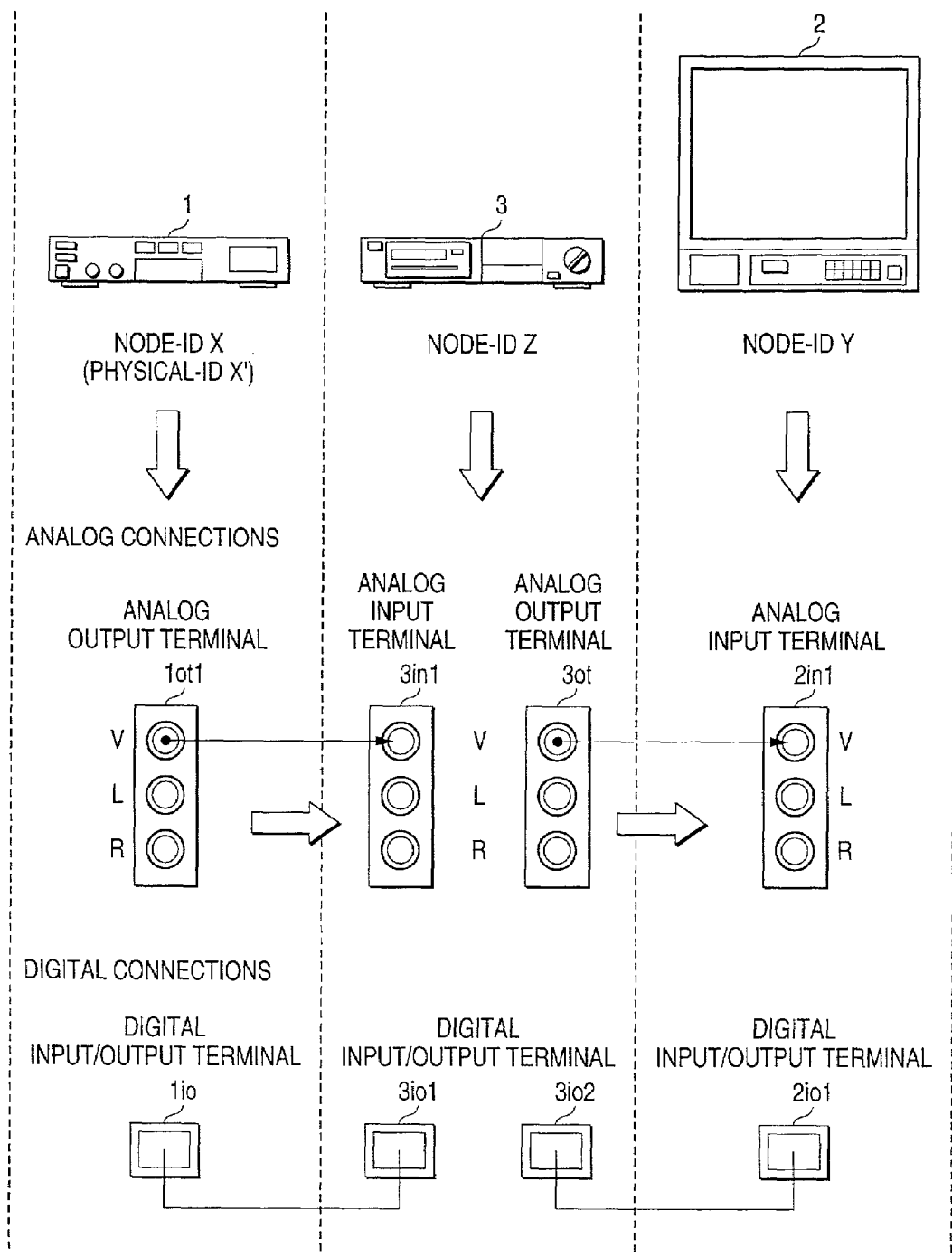
FIG. 13 shows connection relationships of the home network system shown in FIG. 12.

For example, as shown in FIG. 12, an IRD 1 as an information output apparatus is connected to a DVTR 3 as an information input apparatus. Further, the DVTR as an information output apparatus is connected to a monitor receiver 2 as an information input apparatus. In this case, the DVTR 3 serves as an information input Apparatus for the IRD 1 and as an information output apparatus for the monitor receiver 2. The invention can also be applied to the case having the above connections. FIG. 13 shows specific connection relationships of this example.

In this example, as shown in FIG. 13, an analog output terminal 1ot1 of the IRD 1 and an analog input terminal 3in1 of the DVTR 3 are connected to each other. An analog output terminal 3ot of the DVTR 3 and an analog input terminal 2in1 of the monitor receiver 2 are connected to each other.

A digital input/output terminal 1io of the IRD 1 and a digital input/output terminal 3io1 of the DVTR 3 are connected to each other. A digital input/output terminal 3io2 of the DVTR 3 and a digital input/output terminal 2io1 of the monitor receiver 2 are connected to each other.

Also in this case, whether the analog input terminal of the DVTR 3 connected to the analog output terminal of the IRD 1 is the analog input terminal 3in1 or the analog input terminal 3in2 is determined through cooperation between the IRD 1 (information output apparatus) and the DVTR 3 (information input apparatus) in the same manner as in the cases of the above-described first and second embodiments (between the IRD 1 or 7 and the monitor receiver 2 or 8). An identified connection relationship can be managed by both apparatuses.

Similarly, whether the analog input terminal of the monitor receiver 2 connected to, the analog output terminal of the DVTR 3 is the analog input terminal 2in1 or the analog input terminal 2in2 is determined through cooperation between the DVTR 3 (information output apparatus) and the monitor receiver 2 (information input apparatus). An identified connection relationship can be managed by both apparatuses.

Also in a case shown in FIG. 13 in which two apparatuses, that is, a monitor receiver 2 and a DVTR 3, are connected to an IRD 1 in analog form, an analog input terminal connected to the analog output terminal of the IRD 1 can be identified and managed through cooperation between the IRD 1 (information output apparatus) and the monitor receiver 2 (information input apparatus) or between the IRD 1 (information output apparatus) and the DVTR 3 (information input apparatus).

In this case, the IRD 1 and the DVTR 3 are not connected to each other directly via a digital signal line. However, the system being considered is equivalent to a system in which the IRD 1, the monitor receiver 2, and the DVTR 3 are connected to each other via a common digital bus. Therefore, specific information such as a node ID and various kinds of control information can also be exchanged between the IRD 1 and the DVTR 3 and hence an analog input terminal connected to the analog output terminal of the IRD 1 can be identified and managed through cooperation between the IRD 1 and the DVTR 3.

Figure 14:
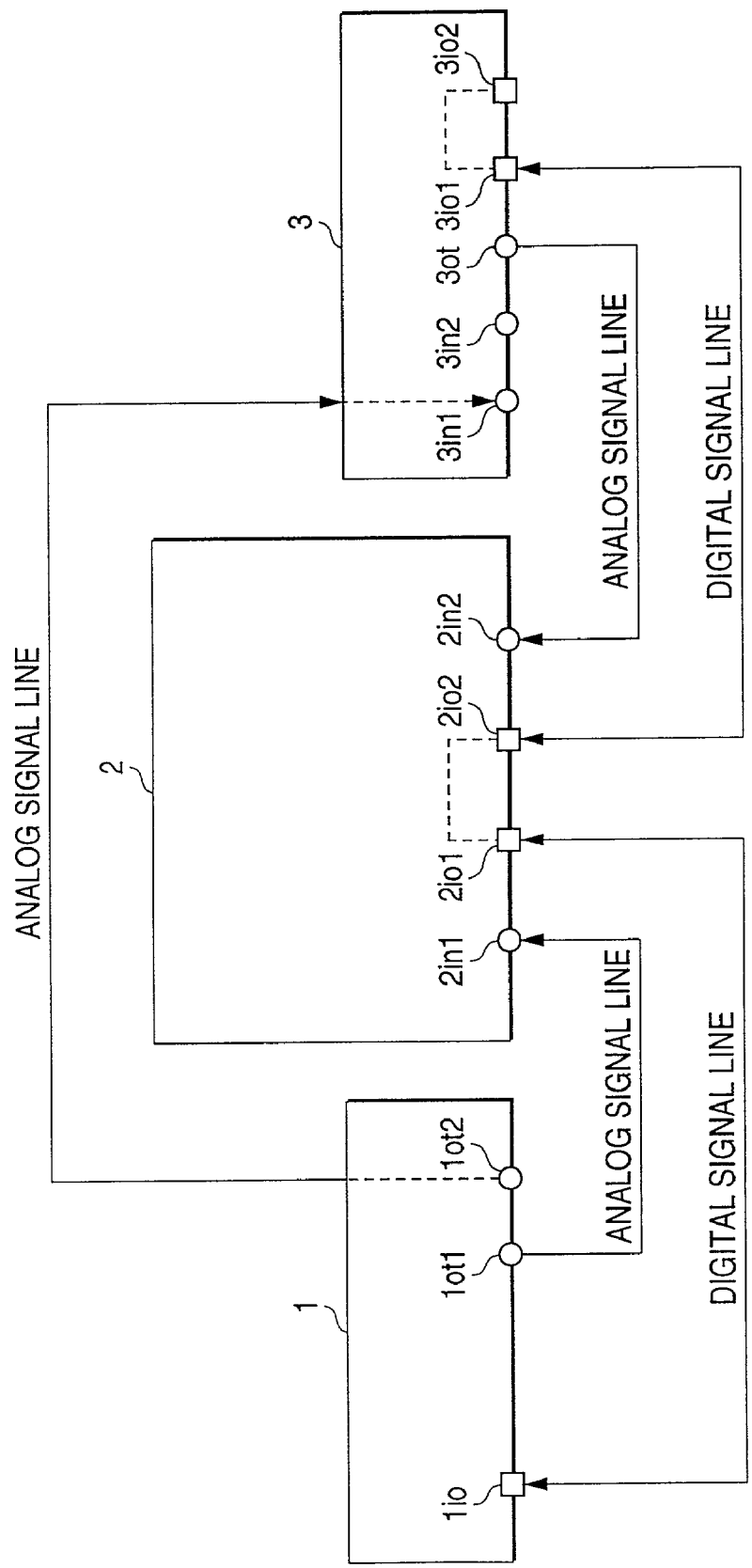
FIG. 14 shows connection relationships of a further exemplary home network system according to the invention that is formed by the information output apparatus and the information input apparatus according to the invention.

Consider a case where in the example of FIG. 14 the digital input/output terminals 2io1 and 2io2 of the monitor receiver 2 have different communication protocols. If there exists a function of bridging those protocols, that is, a function of connecting the different protocols, an analog input terminal connected to the analog output terminal of the IRD 1 can be identified and managed in such a manner that digital communications are performed between the IRD 1 and the DVTR 3 and the IRD 1 supplies the DVTR 3 with an analog signal on which information for identification is superimposed.

As for the relationship between the IRD 1 and the DVTR 3 in the examples of FIGS. 12-14, the DVTR 3 does not have a function of displaying a display message of an identification start request nor a display message of information for identification supplied from the IRD 1. However, in these examples, a measure can be taken that an analog output of the DVTR 3 is supplied to and displayed by the monitor receiver 2.

It is not necessary to supply an analog output of the DVTR 3 to the monitor receiver 2 if the above-described second embodiment is applied to the IRD 1 and the DVTR 3 in such a manner that a display message of an identification start request is displayed on an LCD (liquid crystal display) of the DVTR 3.

As described above, the invention can be applied to cases where various electronic apparatuses such as a DVD, a personal computer, and a digital camcorder (camera-incorporated DVTR) as well as an IRD, a monitor receiver, and a DVTR are connected to each other in both analog form and digital form.

The above embodiments have been described with the assumption that each analog input terminal is what is called a VLR terminal consisting of a video input terminal (V), a left-channel audio input terminal (L), and a right-channel audio input terminal (R). However, the usable analog input terminal is not limited to the VLR terminal; for example, the invention can also be applied to cases where the analog input terminal is an RGB terminal, a composite terminal, a YUV terminal, a YC terminal, or the like.

A plurality of analog input terminals provided in an information input apparatus need not be terminals for receiving input of analog signals according to the same protocol. The invention can be applied to an information input apparatus having analog input terminals for various protocols.

Although the above embodiments have been described for the case of using the IEEE 1394 standard digital interface, the usable digital interface is not limited to the IEEE 1394 standard digital interface. For example, the invention can also be applied to a case of using the USB (universal serial bus) standard digital interface.

The invention can also be applied to a case where an information output apparatus and an information input apparatus are connected to each other via, for example, a control signal line (control line) that enables exchange of specific information of an output source electronic apparatus and control information though it does not enable exchange of information signals such as a video signal and an audio signal, instead of the IEEE 1394 standard digital interface.

The above embodiments have been described for the case where electronic apparatuses are connected to each other via an analog interface and a digital interface (connected in analog form and digital form). In this case, the analog interface is an interface for transmission of only an information signal and the digital interface is an interface enabling exchange of specific information of an electronic apparatus and control information. However, the invention is not limited to such a case.

For example, the invention can be applied to a case where electronic apparatuses are connected to each other via a digital interface enabling transmission of only an information signal and a digital interface enabling exchange of specific information of an electronic apparatus and control information. In short, the invention can be applied to a case where electronic apparatuses are connected to each other by using both of an interface for transmission of only an information signal and an interface enabling transmission of specific information of an electronic apparatus and various kinds of control information. That is, in such a case, a connection relationship between electronic apparatuses that are connected to each other via the interface for transmission of only an information signal can be identified and managed.

The above embodiments have been described in such a manner that both of an information output apparatus and an information input apparatus have a connection management memory and manage connection management information, the invention is not limited to such a case. For example, connection management information may be managed in only one of an information output apparatus and an information input apparatus as exemplified by cases where connection management information is managed in only an information output apparatus of a home network system or, conversely, connection management information is managed in only an information input apparatus of a home network system.

A configuration is possible in which a management device for managing connection management information is provided in an electronic apparatus connected to a home network and this management device manages connection relationships between all electronic apparatuses.

In this case, when the information input apparatus has identified an input terminal that is connected to the output terminal of an information output apparatus, specific information of the information output apparatus, specific information of the self apparatus (information input apparatus), and input terminal identification information indicating the identified input terminal are sent to the management device via an interface enabling transmission of specific information and control information and managed by the management device.

When the information apparatus sends the information input apparatus an information signal via an interface for transmission of only an information signal, the information output apparatus inquires connection relationship management information via an interface enabling transmission of control information. The information output apparatus generates selection control information to be used for selecting an input terminal of the information input apparatus based on connection management information that is transmitted from the management device in response to the inquiry, and sends it to the information input apparatus via the interface enabling transmission of control information. Automatic selection of an input terminal is realized in this manner.

Where it is intended to identify a connection relationship of a connection using an interface for transmission of only an information signal, it is not necessary to manage connection management information in electronic apparatuses. That is, in the first embodiment, a user can correctly recognize an input terminal of an information input apparatus connected to an information output apparatus by identifying it visually.

Also in the second embodiment, a user can correctly recognize an input terminal of an information input apparatus connected to the output terminal of an information output apparatus in such a manner that after identifying an input terminal of the self apparatus connected to the output terminal of the information output terminal, the information input terminal notifies the user about the identified input terminal by using a display device or the like of the information input apparatus.

Although the above first and second embodiments have been described in such a manner that information signal that is transmitted via the analog interface is an analog video signal, the invention is not limited such a case. For example, the invention can also be applied to a case where an analog audio signal is transmitted via the analog interface. In this case, a voice message may be used as information for identification.

As described above, according to the invention, in a case where an information input apparatus having a plurality of input terminals for accepting input of only an information signal and an input/output terminal enabling transmission of at least specific information of an electronic apparatus and control information is connected to an information output apparatus via an input terminal and the input/output terminal, an input terminal connected to the output terminal of the information output apparatus among the input terminals of the information input apparatus can be identified quickly and correctly.

The identified input terminal can be managed in such a manner as to be correlated with the information output apparatus connected to it.

When the information output apparatus sends an information signal via the output terminal enabling output of only an information signal, an input terminal of the information input apparatus connected to the output terminal of the information signal can be selected automatically based on the managed connection relationship.

What is claimed is:

1. An information transmission system comprising:
   at least one information output apparatus configured to output an information signal, including
      an output terminal configured to output an analog signal,
      a related information sending unit configured to send a digital signal including at least specific information regarding the at least one information output apparatus, and
      an information-for-identification superimposing unit configured to superimpose information for identification onto the analog signal to be output from the output terminal; and
   an information input apparatus configured to accept the analog signal from the at least one information output apparatus, including
      plural input terminals configured to accept analog signals,
      a specific information accepting unit configured to accept the digital signal including the specific information,
      a switching unit configured to switch among the plural input terminals,
      an information-for-identification detecting unit configured to detect the information for identification superimposed on one of the analog signals that are accepted by a respective one of the plural input terminals, and to cause the switching unit to switch among the plural input terminals, and
      an identifying unit configured to transmit a digital signal to the at least one output apparatus that identifies the respective one of the plural input terminals that received the analog signal with the information for identification superimposed thereon.

2. An information transmission system comprising:
   at least one information output apparatus configured to output an analog signal, including
      an output terminal configured to output the analog signal,
      a related information sending unit configured to send a digital signal including at least specific information regarding the at least one information output apparatus, and
      an information-for-identification superimposing unit configured to superimpose information for identification onto the analog signal to be output from the output terminal; and
   an information input apparatus configured to accept the analog signal from the at least one information output apparatus, including
      plural input terminals configured to accept analog signals,
      a specific information accepting unit configured to accept the digital signal including specific information,
      a switching unit configured to switch among the plural input terminals,
      a notifying unit configured to notify a user about the information for identification that is superimposed on the analog signal supplied from an input terminal;
      the switching unit is configured to switch among the plural input terminals in order to reproduce the information for identification, and
      a decision manipulation unit configured to accept a command that controls the switching unit.

3. An information transmission system comprising:
   at least one information output apparatus connected to an information input apparatus via a first and second communication interface,
   the at least one information output apparatus includes
      an output terminal for the first communication interface,
      a related information sending unit configured to send a digital signal including specific information of the at least one information output apparatus as additional information via the second communication interface, and
      an information-for-identification superimposing unit configured to superimpose information for identification onto an analog signal to be output from the output terminal; and
   the information input apparatus is configured to accept the analog signal from the at least one information output apparatus via the first communication interface for transmission of the analog signal and a second communication interface for transmission of the digital signal and additional information, the information input apparatus including
      plural input terminals for the first communication interface,
      a specific information accepting unit configured to accept the digital signal including the specific information that is transmitted via the second communication interface,
      a switching unit configured to switch among the plural input terminals,
      an information-for-identification detecting unit configured to detect the information for identification superimposed on one of the analog signals that are accepted by a respective one of the plural input terminals for the first communication interface, and to cause the switching unit to switch among the plural input terminals, and an identifying unit configured to transmit a digital signal to the at least one output apparatus that identifies the respective one of the plural input that received the analog signal.

4. An information transmission system comprising:

at least one information output apparatus connected to an information input apparatus via a first and second communication interface, the output apparatus includes an output terminal for the first communication interface, a related information sending unit configured to send a digital signal including specific information of the at least one information output apparatus as additional information via the second communication interface, and an information-for-identification superimposing unit configured to superimpose information for identification onto analog signal to be output from the output terminal; and the information input apparatus is configured to accept the analog signal from the at least one information output apparatus via a first communication interface for transmission of the analog signal and a second communication interface for transmission of the digital signal and additional information, the information input apparatus including plural input terminals for the first communication interface, a specific information accepting unit configured to accept the digital signal including the specific information that is transmitted via the second communication interface, a switching unit configured to switch among the plural input terminals, a notifying unit configured to notify a user about the information for identification that is superimposed on the analog signal supplied from an input terminal for the first communication interface;

the switching unit is configured to switch among the plural inputs in order to reproduce the information for identification, and a decision manipulation unit configured to accept a command that controls the switching unit.

5. The information transmission system according to claim 1 or 3, wherein the information input apparatus further includes a connection management information recording unit configured to record input terminal identification information indicating the input terminal identified by the identifying unit and the specific information of the at least one information output apparatus in a connection management memory in such a manner that they are correlated with each other.

6. The information transmission system according to claim 2 or 4, wherein the information input apparatus further includes a connection management information recording unit configured to record, when the decision manipulation unit accepts the command, input terminal identification information indicating the input terminal to which switching is made by the switching unit and the specific information of the at least one information output apparatus in a connection management memory in such a manner that they are correlated with each other.

7. The information transmission system according to claim 1, wherein the at least one information output apparatus sends to the information input apparatus via the related information sending unit a switching control signal including the specific information of the at least one information output apparatus to be used for making switching to the input terminal of the information input apparatus that is connected to the output terminal of the at least one information output apparatus before outputting the analog signal via the output terminal.

8. The information transmission system according to claim 1, wherein:

the information input apparatus further includes a connection management information recording unit provided with a connection management memory and configured to record connection management information in the connection management memory, the connection management information including input terminal identification information and the specific information of the at least one information output apparatus such that the input terminal identification information and the specific information are correlated to each other, and the input terminal identification information indicating the input terminal identified by the identifying unit; and the at least one information output apparatus further includes a connection management information supply request generating unit configured to generate a request to supply the connection management information stored in the connection management memory of the information input apparatus, and a switching control signal generating unit configured to generate a switching control signal to be used for making switching to the input terminal of the information input apparatus that is connected to the output terminal of the at least one information output apparatus based on the connection management information that is supplied from the information input apparatus in response to the connection management information supply request, wherein before outputting the analog signal via the output terminal, the at least one information output apparatus sends via the related information sending unit the connection management information supply request and the switching control signal generated by the switching control signal generating unit.

9. The information transmission system according to claim 1 or 3, wherein the at least one information output apparatus further includes:

an input terminal identification information receiving unit configured to receive input terminal identification information of the input terminal identified by the identifying unit of the information input apparatus; and a connection management information recording unit configured to record the input terminal identification information received by the input terminal identification information receiving unit in a connection management memory, wherein before outputting the analog signal via the output terminal, the at least one information output apparatus causes the related information sending unit to send the information input apparatus the input terminal identification information stored in the connection management memory.

10. The information transmission system according to claim 2 or 4, wherein the at least one information output apparatus further includes:

an input terminal identification information receiving unit configured to receive input terminal identification information indicating the input terminal to which switching is made by the switching unit when the decision manipulation unit accepts the deciding manipulation; and a connection management information recording unit configured to record the input terminal identification information received by the input terminal identification information receiving unit in a connection management memory, wherein before outputting the analog signal via the output terminal, the information output apparatus causes the related information sending unit to send the information input apparatus the input terminal identification information stored in the connection management memory.

11. The information transmission system according to claim 2 or 4, wherein the information-for-identification superimposing unit of the at least one information output apparatus is configured to superimpose a display message on the analog signal in a case where the analog signal is a video signal.

12. The information transmission system according to claim 2 or 4, wherein the information-for-identification superimposing unit of the at least one information output apparatus is configured to superimpose a voice message on the analog signal in a case where the analog signal is an audio signal.

13. The information transmission system according to claim 1 or 3, wherein:

the information-for-identification superimposing unit of the information output apparatus superimposes pattern information that is predetermined as the information for identification on the analog signal as information for detection; and the information-for-identification detecting unit of the information input apparatus detects the pattern information superimposed on the analog signal.

14. The information transmission system according to claim 1, wherein:

the at least one information output apparatus further includes a start request receiving unit configured to receive a start request for starting processing of identifying an input terminal that is sent from the information input apparatus, the related information sending unit is configured to send the specific information when the start request receiving unit receives the start request, and the information-for-identification superimposing unit superimposes the information for identification on the analog signal when the start request receiving unit receives the start request; and the information input apparatus further includes a connection management information recording unit provided with a connection management memory and configured to record connection management information in the connection management memory, the connection management information including input terminal identification information and the specific information of the at least one information output apparatus such that the input terminal identification information and the specific information are correlated to each other, and the input terminal identification information indicating the input terminal identified by the identifying unit, a detecting unit configured to detect whether the connection management information is stored in the connection management memory of the information input apparatus, and a start request sending unit configured to send the start request when the detecting unit detects that connection management information is not stored.

15. The information transmission system according to claim 1, wherein the at least one information output apparatus further includes:

an input terminal identification information receiving unit configured to receive input terminal identification information of the input terminal identified by the identifying unit of the information input apparatus;

a connection management information recording unit configured to record the input terminal identification information received by the input terminal identification information receiving unit in a connection management memory;

a detecting unit configured to detect whether the input terminal identification information is stored in the connection management memory of the at least one information output apparatus;

the related information sending unit is configured to send the specific information when the detecting unit detects that the input terminal identification information is not stored; and the information-for-identification superimposing unit is configured to superimpose the information for identification on the analog signal when the detecting unit detects that the input terminal identification information is not stored.

16. The information transmission system according to any one of claims 1 to 4, wherein:

the at least one information output apparatus further includes a manipulation unit configured to accept a start instruction input that commands start of processing of identifying an input terminal of the information input apparatus that is connected to the output terminal of the at least one information output apparatus;

the related information sending unit is configured to send the specific information when the manipulation unit accepts the start instruction input; and the information-for-identification superimposing unit is configured to superimpose the information for identification on the analog signal when the manipulation unit accepts the start instruction input.

17. The information transmission system according to any one of claims 1 to 4, wherein:

the at least one information output apparatus further includes a start request receiving unit configured to receive a start request for start of processing of identifying an input terminal that is sent from the information input apparatus;

the specific information sending unit is configured to send the specific information when the start request receiving unit receives the start request;

the information-for-identification superimposing unit is configured to superimpose the information for identification on the analog signal when the start request receiving unit receives the start request; and the information input apparatus further includes a connection change detecting unit configured to detect a connection change in any of the input terminals of the information input apparatus, and a start request sending unit configured to send the start request when the connection change detecting unit detects a connection change in any of the input terminals.

18. An information output apparatus to be connected to an information input apparatus having a plurality of input terminals for accepting input of an analog signal and capable of accepting input of specific information of the information output apparatus, the information output apparatus comprising:
   an output terminal for outputting only the analog signal;
   a related information sending unit configured to send a digital signal including at least specific information of the information output apparatus; and
   an information-for-identification superimposing unit configured to superimpose information for identification onto the analog signal to be output from the output terminal, so as to be used for identifying an input terminal of the information input apparatus to accept the analog signal.

19. An information output apparatus to be connected to an information input apparatus having a plurality of input terminals for accepting input of an analog signal and capable of accepting input of specific information of the information output apparatus, the information output apparatus comprising:
   an output terminal for outputting the analog signal;
   a related information sending unit configured to send a digital signal including at least specific information of the information output apparatus; and
   an information-for-identification superimposing unit configured to superimpose information for identification onto the analog signal to be output from the output terminal, so as to be used in the information input apparatus to notify a user about the information output apparatus that outputs the analog signal.

20. An information output apparatus to be connected, via a first communication interface for transmission of an analog signal and a second communication interface enabling transmission of a digital signal and additional information, to an information input apparatus having a plurality of input terminals for the first communication interface and capable of accepting the digital signal and the additional information via the second communication interface, the information output apparatus comprising:
   an output terminal for the first communication interface;
   a related information sending unit configured to send the digital signal including specific information of the information output apparatus to the second communication interface; and
   an information-for-identification superimposing unit configured to superimpose information for identification onto the analog signal to be output from the output terminal, so as to be used for identifying an input terminal for the first communication interface of the information input apparatus, the input terminal accepting input of the analog signal.

21. An information output apparatus to be connected, via a first communication interface for transmission of an analog signal and a second communication interface enabling transmission of a digital signal and additional information, to an information input apparatus having a plurality of input terminals for the first communication interface and capable of accepting supply of the digital signal and the additional information via the second communication interface, the information output apparatus comprising:
   an output terminal for the first communication interface;
   a related information sending unit configured to send the digital signal including specific information of the information output apparatus to the second communication interface; and
   an information-for-identification superimposing unit configured to superimpose information for identification onto the analog signal to be output from the output terminal, so as to be used in the information input apparatus to notify a user about the information output apparatus that outputs the analog signal.

22. The information output apparatus according to any one of claims 18 to 21, wherein the information output apparatus sends to the information input apparatus via the related information sending unit a switching control signal including specific information of the information output apparatus and to be used to switch to an input terminal of the information input terminal that is connected to the output terminal of the information output apparatus before outputting the analog signal via the output terminal.

23. The information output apparatus according to any one of claims 18 to 21, further comprising:
   a connection management information supply request generating unit configured to generate a request for supplying connection management information held by the information input apparatus in which specific information of the information output apparatus and input terminal identification information indicating an input terminal connected to the output terminal of the information output apparatus are correlated with each other; and
   a switching control signal generating unit configured to generate a switching control signal to be used for making switching to the input terminal of the information input apparatus that is connected to the output terminal of the information output apparatus based on the connection management information that is supplied from the information input apparatus in response to the connection management information supply request,
   wherein before outputting the analog signal via the output terminal, the information output apparatus is configured to send, via the related information sending unit, the connection management information supply request and the switching control signal generated by the switching control signal generating unit.

24. The information output apparatus according to any one of claims 18 to 21, further comprising:
   an input terminal identification information receiving unit configured to receive input terminal identification information indicating an input terminal identified in the information input apparatus as an input terminal connected to the output terminal of the information output apparatus; and
   a connection management information recording unit configured to record the input terminal identification information received by the input terminal identification information receiving unit in a connection management memory,
   wherein before outputting the analog signal via the output terminal, the information output apparatus causes the related information sending unit to send the information input apparatus the input terminal identification information stored in the connection management memory.

25. The information output apparatus according to any one of claims 18 to 21, further comprising a start request receiving unit configured to receive a request for starting a process of identifying an input terminal that is sent from the information input apparatus, wherein:

the related information sending unit is configured to send the specific information when the start request receiving unit receives the start request; and the information-for-identification superimposing unit is configured to superimpose the information for identification on the analog signal when the start request receiving unit receives the start request.

26. The information output apparatus according to claim 19 or 21, wherein the information-for-identification superimposing unit is configured to superimpose a display message on the analog signal in a case where the analog signal is a video signal.

27. The information output apparatus according to claim 19 or 21, wherein the information-for-identification superimposing unit is configured to superimpose a voice message on the analog signal in a case where the analog signal is an audio signal.

28. The information output apparatus according to claim 18 or 20, wherein the information-for-identification superimposing unit is configured to superimpose pattern information that is predetermined as the information for identification on the analog signal as information for detection.

29. The information output apparatus according to claim 24, further comprising:

a detecting unit configured to detect whether the input terminal identification information is stored in the connection management memory of the information output apparatus, wherein:

the related information sending unit is configured to send the specific information when the detecting unit detects that the input terminal identification information is not stored; and the information-for-identification superimposing unit is configured to superimpose the information for identification on the analog signal when the detecting unit detects that the input terminal identification information is not stored.

30. The information output apparatus according to any one of claims 18 to 21, further comprising a manipulation unit configured to accept a start instruction command that starts a process of identifying an input terminal of the information input apparatus that is connected to the output terminal of the information output apparatus, wherein:

the related information sending unit configured to send the specific information when the manipulation unit accepts the start instruction input; and the information-for-identification superimposing unit is configured to superimpose the information for identification on the analog signal when the manipulation unit accepts the start instruction command.

31. An information input apparatus to be connected to an information output apparatus having an output terminal for outputting an analog signal and capable of sending a digital signal including specific information of the information output apparatus, the information input apparatus comprising:

plural input terminals for accepting input of the analog signal;

a specific information accepting unit configured to accept input of the digital signal including specific information;

a switching unit configured to switch among the plural input terminals;

an information-for-identification detecting unit configured to detect information for identification from each of the analog signals that is accepted via a respective one of the plural input terminals, and to cause the switching unit to switch among the plural input terminals; and an identifying unit configured to transmit a digital signal to the at least one output apparatus that identifies an input terminal of the analog signal from which the information for identification is detected by the information-for-identification detecting unit as an input terminal of the analog signal sent from the at least one information output apparatus that sent the specific information accepted by the specific information accepting unit.

32. An information input apparatus to be connected to an information output apparatus having an output terminal for outputting an analog signal and capable of sending a digital signal including specific information of the information output apparatus, the information input apparatus comprising:

plural input terminals for accepting input of the analog signal;

a specific information accepting unit configured to accept input of the digital signal including specific information;

a switching unit configured to switch among the plural input terminals;

a notifying unit configured to notify a user about information for identification that is superimposed on the analog signal supplied from an input terminal;

the switching unit is configured to switch among the plural input terminals in order to reproduce the information for identification; and a decision manipulation unit configured to accept a command that controls the switching unit.

33. An information input apparatus to be connected, via a first communication interface for transmission of analog signal and a second communication interface enabling transmission of a digital signal and additional information, to an information output apparatus having an output terminal for the first communication interface and capable of sending information to the second communication interface, the information input apparatus comprising:

plural input terminals for the first communication interface;

a specific information accepting unit configured to accept a digital signal including specific information that is transmitted via the second communication interface;

a switching unit configured to switch among the plural input terminals;

an information-for-identification detecting unit configured to detect information for identification from each of analog signals that is accepted by a respective one of the plural input terminals for the first communication interface, and to cause the switching unit to switch among the plural input terminals; and an identifying unit configured to identify an input terminal of the analog signal from which information for identification is detected by the information-for-identification detecting unit as an input terminal of the analog signal sent from an information output apparatus that sent the specific information accepted by the specific information accepting unit.

34. An information input apparatus to be connected, via a first communication interface for transmission of an analog signal and a second communication interface enabling transmission of a digital signal and additional information, to an information output apparatus having an output terminal for the first communication interface and capable of sending information to the second communication interface, the information input apparatus comprising:
plural input terminals for the first communication interface;
a specific information accepting unit configured to accept the digital signal including specific information that is transmitted via the second communication interface;
a switching unit configured to switch among the plural input terminals;
a notifying unit configured to notify a user about information for identification that is superimposed on the analog signal supplied from an input terminal for the first communication interface;
the switching unit is configured to switch among the plural input terminals in order to reproduce the information for identification; and
a decision manipulation unit configured to accept a command that controls the switching unit.

35. The information input apparatus according to claim 31 or 33, further comprising a connection management information recording unit configured to record input terminal identification information indicating the input terminal identified by the identifying unit and the specific information of the information output apparatus in a connection management memory in such a manner that they are correlated with each other.

36. The information input apparatus according to claim 32 or 34, further comprising a connection management information recording unit configured to record, when the decision manipulation unit accepts the deciding manipulation, input terminal identification information indicating the input terminal to which switching is made by the switching unit and the specific information of the information output apparatus in an connection management memory in such a manner that they are correlated with each other.

37. The information input apparatus according to any one of claims 31 to 34, further comprising a switching control unit configured to control the switching unit in accordance with a switching control signal that is sent from the information output apparatus and accepted by the related information accepting unit.

38. The information input apparatus according to claim 31, further comprising:
a connection management information recording unit provided with a connection management memory and configured to record connection management information in the connection management memory, the connection management information including input terminal identification information and the specific information of the information output apparatus such that the input terminal identification information and the specific information are correlated to each other, and the input terminal identification information indicating the input terminal identified by the identifying unit;
a connection management information sending unit configured to send the information output apparatus the connection management information stored in the connection management memory in response to a connection management information supply request that is sent from the information output apparatus and accepted by the related information accepting unit; and
a switching control unit configured to control the switching unit in accordance with a switching control signal that is sent from the information output apparatus and accepted by the related information accepting unit.

39. The information input apparatus according to claim 32 or 34, wherein the information for identification that is superimposed on the analog signal is a display message.

40. The information input apparatus according to claim 32 or 34, wherein the information for identification that is superimposed on the analog signal is a voice message.

41. The information input apparatus according to claim 31 or 33, wherein:
the information for identification is predetermined pattern information; and
the information-for-identification detecting unit detects the pattern information that is superimposed on the analog signal.

42. The information input apparatus according to claim 31, further comprising:
a connection management information recording unit provided with a connection management memory and configured to record connection management information in the connection management memory, the connection management information including input terminal identification information and the specific information of the information output apparatus such that the input terminal identification information and the specific information are correlated to each other, and the input terminal identification information indicating the input terminal identified by the identifying unit;
a detecting unit configured to detect whether the connection management information is stored in the connection management memory of the information input apparatus; and
a start request sending unit configured to send a start request for starting a process of identifying an input terminal of the information input apparatus to which the output terminal of the information output apparatus is connected when the detecting unit detects that the connection management information is not stored.

43. The information input apparatus according to any one of claims 31 to 34, further comprising:
a connection change detecting unit configured to detect a connection change in any of the plural input terminals of the information input apparatus; and
a start request sending unit configured to send a request for starting a process of identifying an input terminal of the information input apparatus to which the output terminal of the information output apparatus is connected when the connection change detecting unit detects a connection change in any of the plural input terminals.

44. A connection relationship identification method for identifying an input terminal of an information input apparatus to which an information output apparatus is connected, the connection relationship identification method comprising:
providing the information output apparatus connected to the information input apparatus via one of plural input terminals of the information input apparatus, the one of the plural input terminals accepting an analog signal;
providing the information input apparatus capable of accepting a digital signal including specific information of the information output apparatus;
sending the digital signal including specific information of the information output apparatus from the information output apparatus to the information input apparatus;

sending information for identification from the information output apparatus to be used to identify an input terminal of the information input apparatus, the information for identification being superimposed on the analog signal to be output via an output terminal connected to the input terminal of the information input apparatus;

detecting by the information input apparatus the information for identification superimposed on the analog signal supplied via the input terminal by switching among the plural input terminals; and transmitting a digital signal identifying an input terminal of the analog signal to the output apparatus, from which the information for identification is detected, as an input terminal of the analog signal sent from the information output apparatus that sent the specific information.

45. A connection relationship identification method for identifying an input terminal of an information input apparatus to which an information output apparatus is connected, the connection relationship identification method comprising:

providing the information output apparatus connected to the information input apparatus via one of plural input terminals of the information input apparatus, the one of the plural input terminals accepting an analog signal;

providing the information input apparatus capable of accepting a digital signal including specific information of the information output apparatus;

sending the digital signal including specific information of the information output apparatus from the information output apparatus to the information input apparatus;

sending information for identification from the information output apparatus to be used in the information input apparatus to notify a user about the information output apparatus that outputs the analog signal in such a manner that it is superimposed on the analog signal to be output via an output terminal connected to an input terminal of the information input apparatus;

notifying, with the information input apparatus, a user about the information for identification superimposed on the analog signal that is supplied via the input terminal by reproducing it while switching among the plural input terminals; and accepting, with the information input apparatus, a decision manipulation if the information for identification is superimposed on the analog signal supplied from the input terminal switched to, and identifying the input terminal that is selected at the time of the decision manipulation as an input terminal of the analog signal sent from the information output apparatus that sent the specific information.

46. A connection relationship identification method for identifying an input terminal of an information input apparatus to which an information output apparatus is connected, the connection relationship identification method comprising:

providing the information output apparatus connected to the information input apparatus having plural input terminals for a first communication interface for transmission of an analog signal via the first communication interface and a second communication interface enabling transmission of a digital signal and additional information;

sending the digital signal including specific information of the information output apparatus from the information output apparatus to the information input apparatus via the second communication interface;

sending information for identification from the information output apparatus to be used to identify an input terminal of the information input apparatus in such a manner that it is superimposed on the analog signal to be supplied to the information input apparatus via the first communication interface;

detecting, with the information input apparatus, the information for identification from the analog signal supplied via the input terminal by switching among the plural input terminals; and transmitting a digital signal identifying an input terminal of the analog signal to the output apparatus, from which the information for identification is detected as an input terminal of the analog signal sent from the information output apparatus that sent the specific information.

47. A connection relationship identification method for identifying an input terminal of an information input apparatus to which an information output apparatus is connected, the connection relationship identification method comprising:

providing the information output apparatus connected to the information input apparatus having plural input terminals for a first communication interface for transmission of an analog signal via the first communication interface and a second communication interface enabling transmission of a digital signal and additional information;

sending the digital signal including specific information of the information output apparatus from the information output apparatus to the information input apparatus via the second communication interface;

sending information for identification from the information output apparatus to be used in the information input apparatus to notify a user about the information output apparatus that outputs the analog signal in such a manner that it is superimposed on the analog signal to be supplied to the information input apparatus via the first communication interface;

notifying, with the information input apparatus, a user about the information for identification superimposed on the analog signal that is supplied via the input terminal by reproducing it while switching among the plural input terminals;

accepting, with the information input apparatus, a decision manipulation if the information for identification is superimposed on the analog signal supplied from the input terminal that is switched to; and transmitting a digital signal identifying the input terminal, to the output apparatus, that is selected at the time of the decision manipulation as an input terminal of the analog signal sent from the information output apparatus that sent the specific information.

48. A connection relationship identification method for identifying an input terminal of an information input apparatus to which an information output apparatus is connected, the connection relationship identification method comprising:

providing the information output apparatus connected to the information input apparatus via one of plural input terminals of the information input apparatus, the one of the plural input terminals accepting an analog signal;

providing the information input apparatus capable of accepting a digital signal including specific information of the information output apparatus;

transmitting a start request wherein the information output apparatus sends the information input apparatus a start request that includes specific information of the information output apparatus and requests a start of a process of identifying an input terminal of the information input apparatus to which the information output apparatus is connected;

sending, from the information output apparatus, information for identification to be used for identifying an input terminal of the information input apparatus in such a manner that it is superimposed on the analog signal to be output via an output terminal connected to the input terminal of the information input apparatus;

detecting the information for identification, wherein the information input apparatus detects the information for identification from the analog signal supplied via the input terminal by switching among the plural input terminals; and transmitting a digital signal identifying an input terminal of the analog signal, to the output apparatus from which the information for identification is detected.

49. A connection relationship identification method for identifying an input terminal of an information input apparatus to which an information output apparatus is connected, the connection relationship identification method comprising:

providing the information output apparatus connected to the information input apparatus via one of plural input terminals of the information input apparatus, the one of the plural input terminals accepting an analog signal;

providing the information input apparatus capable of accepting a digital signal including specific information of the information output apparatus;

transmitting a start request wherein the information output apparatus sends the information input apparatus a start request that includes specific information of the information output apparatus and requests a start of a process of identifying an input terminal of the information input apparatus to which the information output apparatus is connected;

sending from the information output apparatus information for identification to be used in the information input apparatus to notify a user about the information output apparatus that outputs the analog signal in such a manner that it is superimposed on the analog signal to be output via an output terminal connected to the input terminal of the information input apparatus;

notifying a user about the information for identification superimposed on the analog signal that is supplied via the input terminal by reproducing it while switching among the input terminals;

identifying an input terminal, wherein the information input apparatus accepts a decision manipulation if the information for identification is superimposed on the analog signal supplied from the input terminal that is switched to when the user is notified about the information for identification in the information-for-identification notification step; and transmitting a digital signal to the output apparatus that identifies the input terminal that is selected at the time of the decision manipulation as an input terminal of the analog signal sent from the information output apparatus that sent the specific information.

50. A connection relationship identification method for identifying an input terminal of an information input apparatus to which an information output apparatus is connected, the connection relationship identification method comprising:

providing the information output apparatus connected to the information input apparatus having plural input terminals for a first communication interface for transmission of an analog signal via the first communication interface and a second communication interface enabling transmission of a digital signal and additional information;

sending a start request from the information output apparatus to the information input apparatus via the second communication interface that includes specific information of the information output apparatus and requests a start of a process of identifying an input terminal of the information input apparatus to which the information output apparatus is connected;

sending information for identification to be used for identifying an input terminal of the information input apparatus in such a manner that it is superimposed on the analog signal to be supplied to the information input apparatus via the first communication interface;

detecting, with the information input apparatus, the information for identification from the analog signal supplied via the input terminal by switching among the input terminals; and transmitting a digital signal identifying an input terminal of the analog signal, to the output apparatus, from which the information for identification is detected as an input terminal of the analog signal sent from the information output apparatus that sent the specific information if the information for identification is detected in the detecting the information for identification.

51. A connection relationship identification method for identifying an input terminal of an information input apparatus to which an information output apparatus is connected, the connection relationship identification method comprising:

providing the information output apparatus connected to the information input apparatus having plural input terminals for a first communication interface for transmission of an analog signal via the first communication interface and a second communication interface enabling transmission of a digital signal and additional information;

sending a start request from the information output apparatus to the information input apparatus via the second communication interface that includes specific information of the information output apparatus and requests a start of a process of identifying an input terminal of the information input apparatus to which the information output apparatus is connected;

sending information for identification from the information output apparatus to be used in the information input apparatus to notify a user about the information output apparatus that outputs the analog signal in such a manner that the information for identification is superimposed on the analog signal to be supplied to the information input apparatus via the first communication interface;

notifying a user about the information for identification superimposed on the analog signal that is supplied via the input terminal by reproducing the information for identification superimposed on the analog signal while switching among the input terminals;

identifying an input terminals wherein the information input apparatus accepts a decision manipulation if the information for identification is superimposed on the analog signal supplied from the input terminal to which switching is made when the user is notified about the information for identification in the information-for-identification notification step; and transmitting a digital signal to the output apparatus that identifies the input terminal that is selected at the time of the decision manipulation as an input terminal of the analog signal sent from the information output apparatus that sent the specific information.

52. The connection relationship identification method according to any one of claims 44 to 51, further comprising
recording terminal identification information indicating the input terminal identified in the identifying the input terminal and the specific information of the information output apparatus in a connection management memory in such a manner that they are correlated with each other.

53. The connection relationship identification method according to claim 52, further comprising:
sending, from the information output apparatus, a switching control signal including the specific information of the information output apparatus to be used for making switching to the input terminal of the information input terminal that is connected to the output terminal of the self apparatus before outputting the analog signal via the output terminal.

54. The connection relationship identification method according to claim 52, further comprising:
sending a request for supplying connection management information stored in the connection management memory in which the input terminal identification information and the specific information of the information output apparatus are correlated with each other;
sending a switching control signal to be used for switching to the input terminal of the information input apparatus that is connected to the output terminal of the information output apparatus based on the connection management information that is supplied from the information input apparatus in response to the connection management information supply request; and
sending the generated switching control signal to the information input apparatus.

55. The connection relationship identification method according to claim 44 or 45, further comprising:
receiving an input terminal identification information, at the information output apparatus, indicating the input terminal that received the analog signal;
recording, in a connection management memory, the input terminal identification information received in the receiving the input terminal identification information step; and
sending to the information input apparatus the input terminal identification information stored in the connection management memory before outputting analog signal via the output terminal.

56. The connection relationship identification method according to any one of claims 45, 47, 49, and 51, wherein in the sending the information for identification a display message is superimposed on the analog signal in a case where the analog signal is a video signal.

57. The connection relationship identification method according to any one of claims 45, 47, 49, and 51, wherein in the sending the information for identification a voice message is superimposed on the analog signal in a case where the analog signal is an audio signal.

58. The connection relationship identification method according to any one of claims 44, 46, 48, and 50, wherein:
the sending information for identification step includes sending pattern information that is predetermined as the information for identification is superimposed on the analog signal as information for detection; and
the detecting step includes detecting the pattern information superimposed on the analog signal.

59. The connection relationship identification method according to claim 44, further comprising:
recording a connection management information wherein the information input apparatus records the connection management information in a connection management memory, the connection management information including input terminal identification information and the specific information of the information output apparatus such that the input terminal identification information and the specific information are correlated with each other, and the input terminal identification information indicating the input terminal identified in the identifying the input terminal;
detecting, with the information input apparatus, whether the connection management information is stored in the connection management memory of the information input apparatus; and
sending a start request from the information input apparatus when the connection management information is not stored.

60. The connection relationship identification method according to claim 55, further comprising
detecting whether the input terminal identification information is stored in the connection management memory of the information output apparatus,
wherein the step of sending the start request includes sending the start request when the detecting step detects that the input terminal identification information is not stored.

61. The connection relationship identification method according to any one of claims 44 to 51, further comprising:
accepting an identification instruction input that commands identification of an input terminal of the information input apparatus that is connected to the output terminal of the information output apparatus,
wherein the step of sending the start request includes sending the start request when the identification instruction input is made.

62. The connection relationship identification method according to any one of claims 44 to 51, further comprising:
detecting a connection change in any of the input terminals of the information input apparatus; and
sending a start request when, in the detecting step, a connection change detecting unit detects a connection change in any of the input terminals.

* * * * *

UNITED STATES PATENT AND TRADEMARK OFFICE
CERTIFICATE OF CORRECTION

PATENT NO. : 7,178,157 B1 Page 1 of 1
APPLICATION NO. : 09/708256
DATED : February 13, 2007
INVENTOR(S) : Yuji Kimura et al.

It is certified that error appears in the above-identified patent and that said Letters Patent is hereby corrected as shown below:

Column 1, line 58, change "are, digital" to --are digital--.
Column 20, line 37, change "via that" to --via the analog input terminal 2in1, 2in2, and 2in3 and video signals that--.
Column 33, line 34, change "1A" to --11A--.
Column 33, line 35, change "1B" to --11B--.
Column 34, line 8, change "1B" to --11B--.
Column 55, line 1, change "terminals" to --terminal,--.
Column 56, line 10, change "identification is superimposed" to --identification superimposed--.
Column 56, line 36, change "comprising" to --comprising:--

Signed and Sealed this

Eighteenth Day of September, 2007

JON W. DUDAS
*Director of the United States Patent and Trademark Office*